United States Patent
Fazio et al.

(10) Patent No.: US 11,918,927 B1
(45) Date of Patent: Mar. 5, 2024

(54) GLOW-IN-THE-DARK STRING AND STRING SHOOTING DEVICE

(71) Applicant: ZipString LLC, Johns Creek, GA (US)

(72) Inventors: Stephen Giovanni Fazio, Johns Creek, GA (US); Austin Mark Hillam, Johns Creek, GA (US); Mark Gordon Hillam, Johns Creek, GA (US)

(73) Assignee: ZIPSTRING LLC, Johns Creek, GA (US)

(*) Notice: Subject to any disclaimer, the term of this patent is extended or adjusted under 35 U.S.C. 154(b) by 0 days.

(21) Appl. No.: 18/454,352

(22) Filed: Aug. 23, 2023

Related U.S. Application Data

(60) Provisional application No. 63/377,257, filed on Sep. 27, 2022.

(51) Int. Cl.
| | |
|---|---|
| *A63H 29/24* | (2006.01) |
| *A63H 29/22* | (2006.01) |
| *A63H 33/22* | (2006.01) |
| *F21V 9/32* | (2018.01) |

(52) U.S. Cl.
CPC ............. *A63H 29/24* (2013.01); *A63H 29/22* (2013.01); *A63H 33/22* (2013.01); *F21V 9/32* (2018.02)

(58) Field of Classification Search
CPC ........ A63H 29/00; A63H 29/22; A63H 29/24; A63H 33/22
USPC ................................. 446/236, 242, 247, 475
See application file for complete search history.

(56) References Cited

U.S. PATENT DOCUMENTS

| | | | | |
|---|---|---|---|---|
| 5,733,169 | A * | 3/1998 | Tsai ........................ | A63H 27/00 446/237 |
| 5,749,761 | A * | 5/1998 | Kim ........................ | A63H 29/18 446/44 |
| 2019/0298010 | A1* | 10/2019 | Hacsi ...................... | A63H 29/24 |

* cited by examiner

*Primary Examiner* — Kien T Nguyen
(74) *Attorney, Agent, or Firm* — ALSTON & BIRD LLP

(57) ABSTRACT

Provided herein is a string shooting device having a string capable of emitting light absorbed from a light source. A string shooting device described herein includes: a body; a housing attached to the body; a pair of wheels disposed at least partially within the housing, where at least one of the pair of wheels is a driven wheel; a string, where the string includes at least one of phosphorescent particles or phosphorescent fibers, and where the string is propelled along a path by the pair of wheels; and a light source, where the light source is configured to project illumination to the path along which the string travels within the housing.

24 Claims, 20 Drawing Sheets

GLOW-IN-THE-DARK STRING AND STRING SHOOTING DEVICE

CROSS-REFERENCE TO RELATED APPLICATIONS

This application claims priority to U.S. Provisional Patent Application Ser. No. 63/377,257, filed on Sep. 27, 2022, the contents of which are hereby incorporated by reference in their entirety.

TECHNOLOGICAL FIELD

Example embodiments relate generally to a string shooting device, and more particularly, to a string shooting device having a glow-in-the-dark string charged from an embedded light source, capable of emitting light and generating lift when propelled from the string shooting device and a guide to readily attach and detach the string from the string shooting device.

BACKGROUND

Propelling a flexible member such as a rope, string, or chain, is challenging as the inherent flexibility of such a member tends to allow a distal portion to succumb to gravity resulting in a short distance traveled by the member before dropping. To propel a flexible member further, increased air friction and greater speed is used in an effort to extend an arc of the flexible member, resulting in the flexible member traveling a greater distance before succumbing to gravity. Alternately or additionally, an exit angle from the apparatus propelling the flexible member can be changed to optimize the arc of the flexible member as it is propelled against gravity.

Propelling a flexible member beyond merely an arc is challenging and requires balancing physical characteristics of the flexible member and the limitations of the apparatus propelling the flexible member.

Phosphorescent materials, when in light exposure, absorb light to be charged and emit light for a relatively prolonged duration after the light exposure ceases. When leveraged in manufacturing, goods with phosphorescent materials are generally referred to as glow-in-the-dark.

BRIEF SUMMARY

The present disclosure relates generally to a string shooting device, and more particularly, to a string shooting device having a light source and a string capable of absorbing and emitting light.

Embodiments provided herein include a string shooting device including: a body; a housing attached to the body; a pair of wheels disposed at least partially within the housing, wherein at least one of the pair of wheels is a driven wheel; a string, where the string comprises at least one of phosphorescent particles or phosphorescent fibers. The string of an example embodiment is propelled along a path by the pair of wheels and a light source is configured to project illumination to the path along which the string travels within the housing. The light source of an example embodiment includes at least one of a LED light, an ultraviolet light, an incandescent light, a laser, a fluorescent light, or another light source capable of emitting light absorbable by phosphorescent materials.

According to certain embodiments, the light source is configured to be at least partially within the body of the device. The light source of an example embodiment charges the phosphorescent particles or phosphorescent fibers of the string as the string travels along the path within the housing. According to certain embodiments, the light source further includes a light guide where the light guide directs light from the light source to the path along which the string travels within the housing. The light guide of an example embodiment includes an optical element that conducts light along an illumination path. As the string travels along the path, phosphorescent particles or phosphorescent fibers of the string are charged by the light illuminated by the light source.

According to some embodiments, the housing shades the light source from view from outside of the string shooting device. The string of an example embodiment includes phosphorescent particles or phosphorescent fibers embedded in or on the string. The phosphorescent particles or fibers of an example embodiment are included in only a portion of the length of the string, around half of the length of the string, in a pattern of alternating portions of the string having phosphorescent particles or phosphorescent fibers and portions of the string not having phosphorescent particles or phosphorescent fibers, or another pattern causing the string to have particular desirable visual effects, particularly when the string is in motion.

According to certain embodiments, the string shooting device further includes a power switch and a light switch, where the power switch in an on state causes the driven wheel to be driven and where the light switch in an on state causes the light source to illuminate in response to the power switch also being in the on state. According to certain embodiments, the light switch includes a photo sensor where the photo sensor causes the light source to illuminate in response to a level of light sensed at the photo sensor being below a predetermined value.

Embodiments provided herein include a string shooting device including: a body; a housing attached to the body; a pair of wheels disposed at least partially within the housing, where at least one of the pair of wheels is a driven wheel; a light source; and a light guide, where the light guide is configured to guide light from the light source to a location on a path of travel of a string propelled by the string shooting device. The string shooting device further includes, in some embodiments, a string where the string includes at least one of phosphorescent particles or phosphorescent fibers and where the string is propelled along the path of travel. The light source of some embodiments is not visible from outside of the housing of the device. The light guide of some embodiments includes an optical element that conducts light along an illumination path.

According to some embodiments, the string shooting device further includes a shroud where the shroud substantially blocks light from the light source from escaping the housing. According to some embodiments, the string shooting device further includes a power switch and a light switch, where the power switch in an on state causes the driven wheel to be driven and where the light switch in an on state causes the light source to illuminate in response to the power switch also being in the on state. The light switch of some embodiments includes a photo sensor where the photo sensor causes the light source to illuminate in response to a level of light sensed at the photo sensor being below a predetermined value.

BRIEF DESCRIPTION OF THE DRAWINGS

Having thus described embodiments of the disclosure in general terms, reference will now be made to the accompa- nying drawings, which are not necessarily drawn to scale. The following drawings are illustrative of particular embodiments of the present disclosure and do not limit the scope of the present disclosure. Moreover, the drawings are intended for use in conjunction with the explanations provided herein. Example embodiments of the present disclosure will hereinafter be described in conjunction with the appended drawings.

Figure 1:
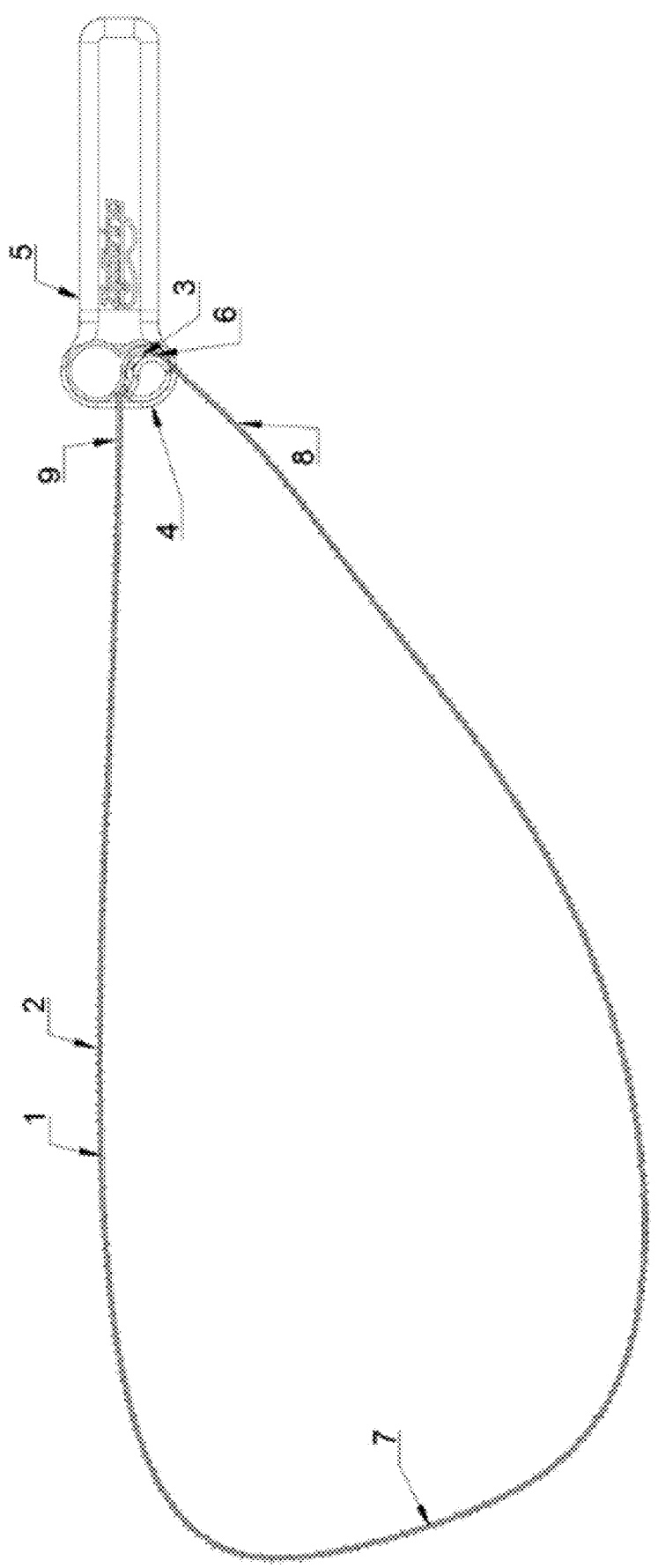
Figure 2:
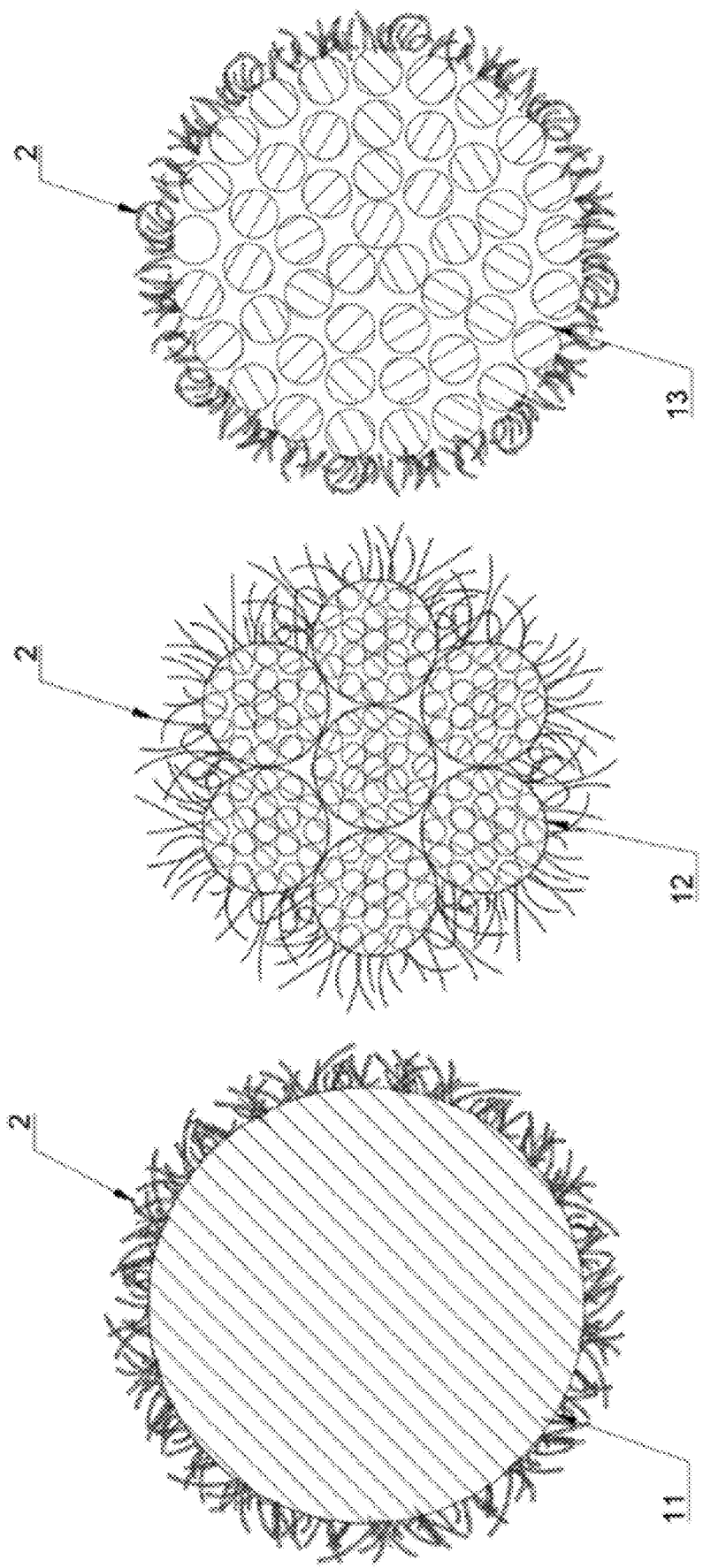
Figure 3:
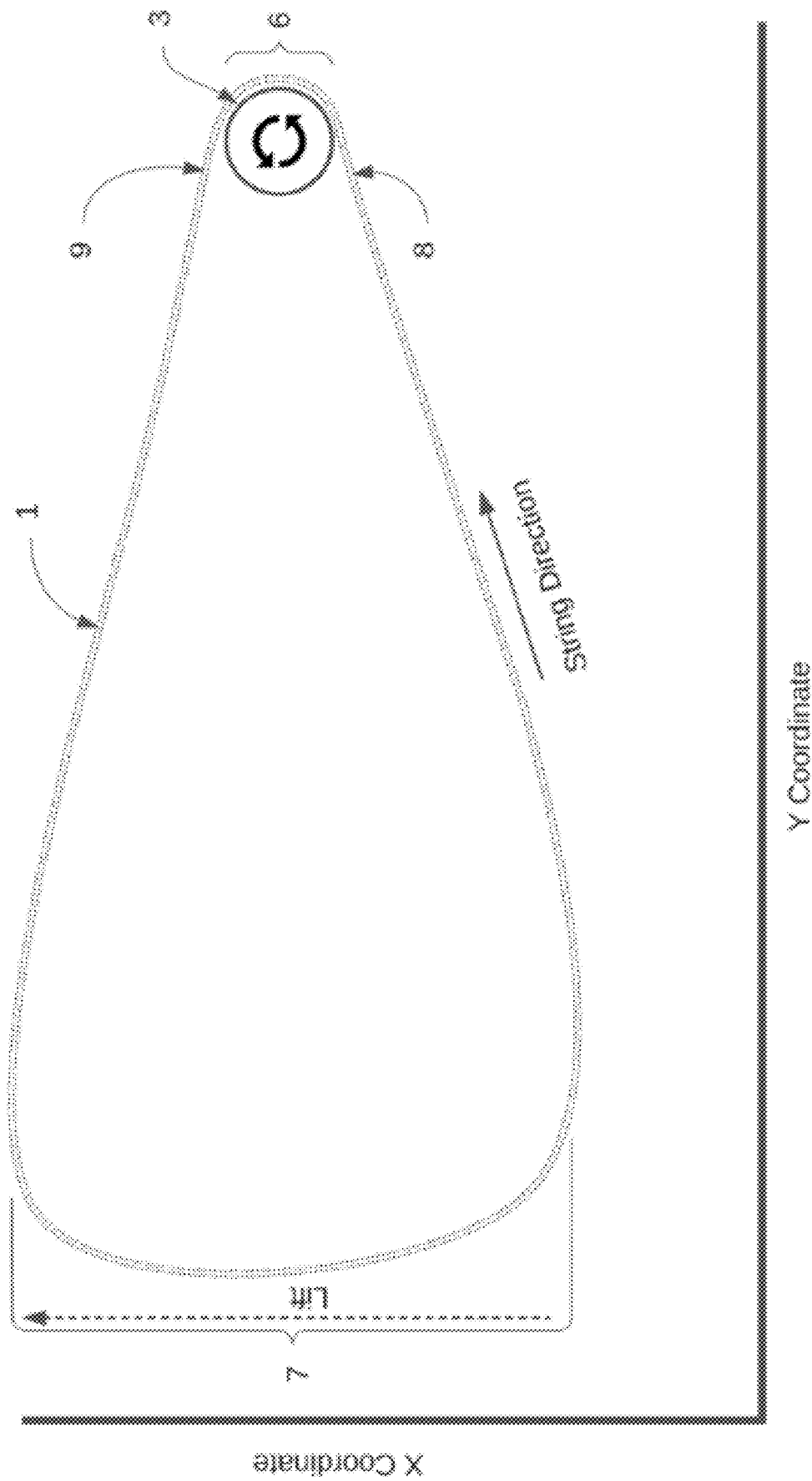
Figure 4:
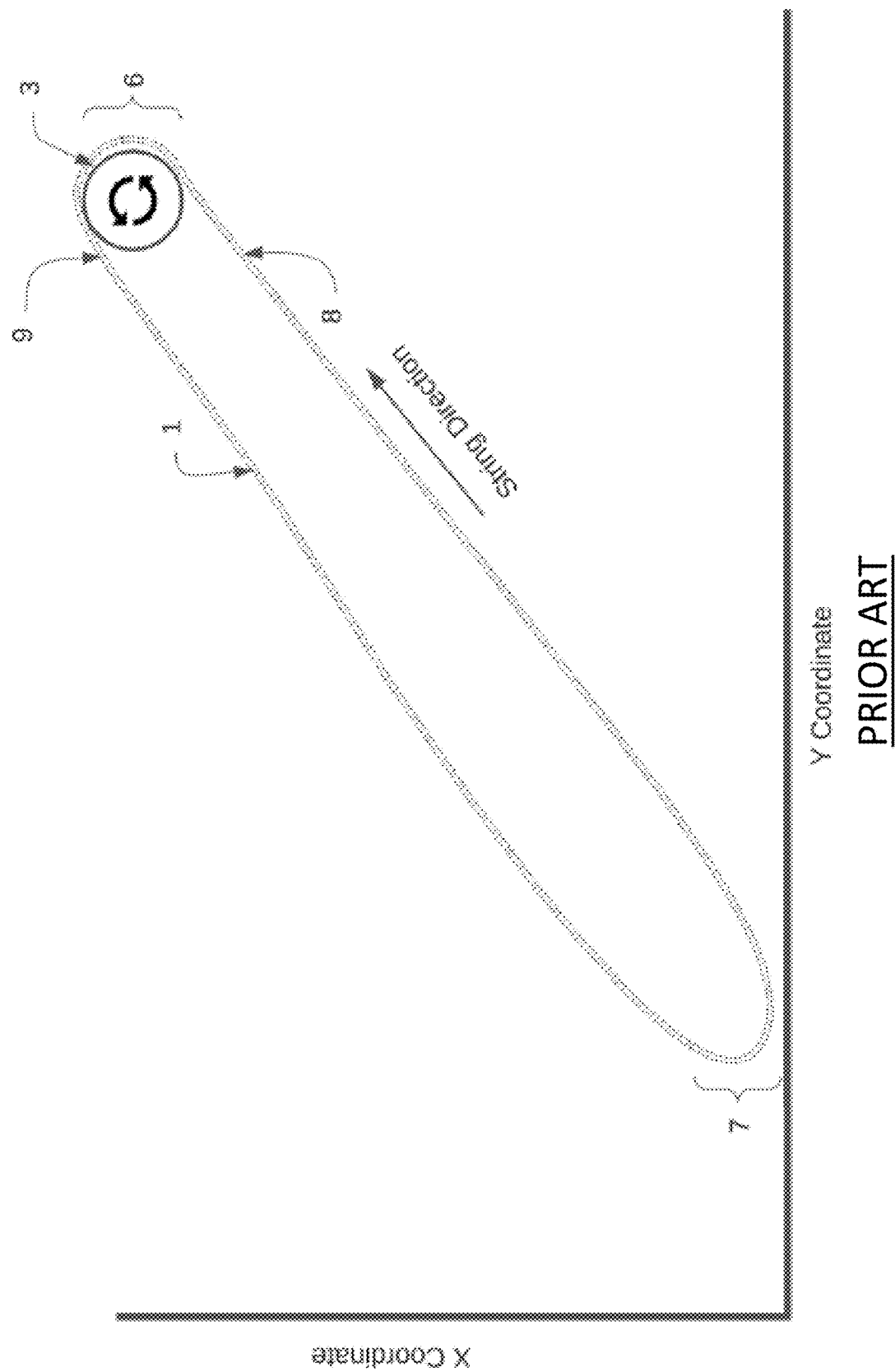
Figure 5:
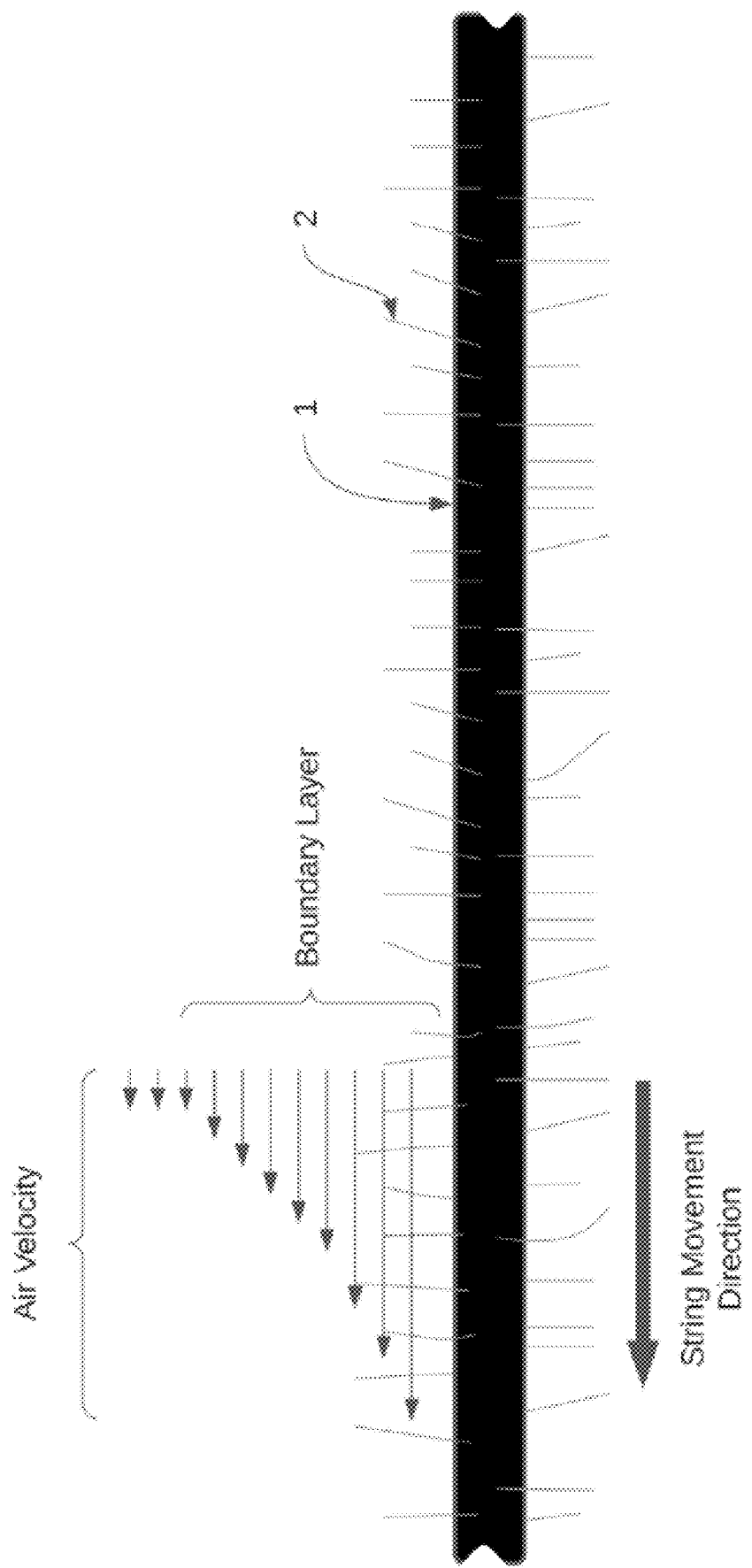
Figure 7:
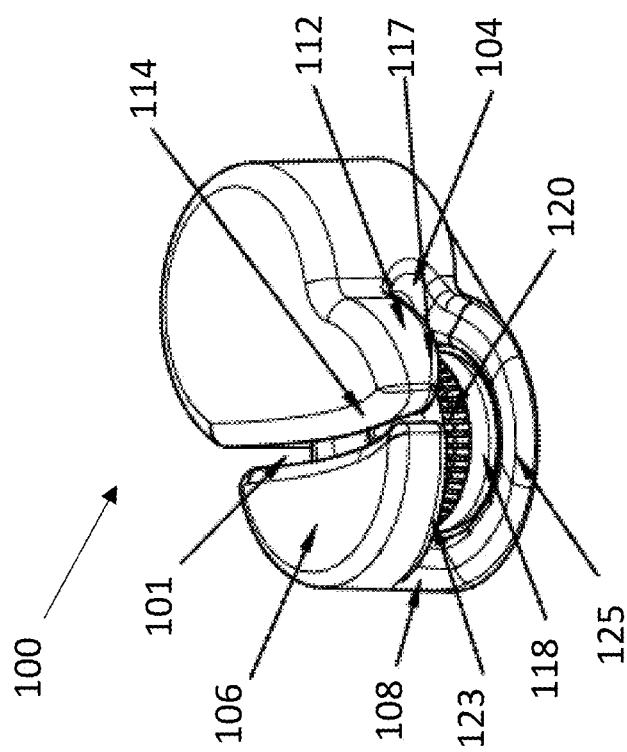
Figure 6:
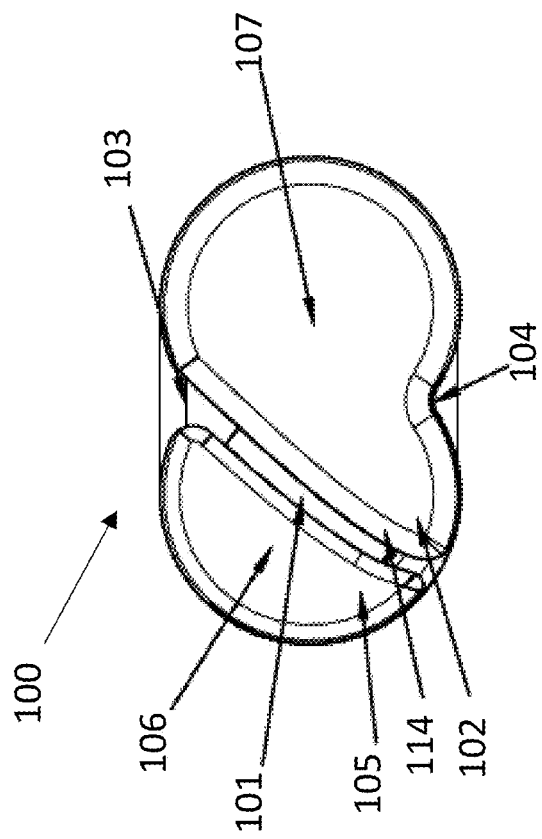
Figure 9:
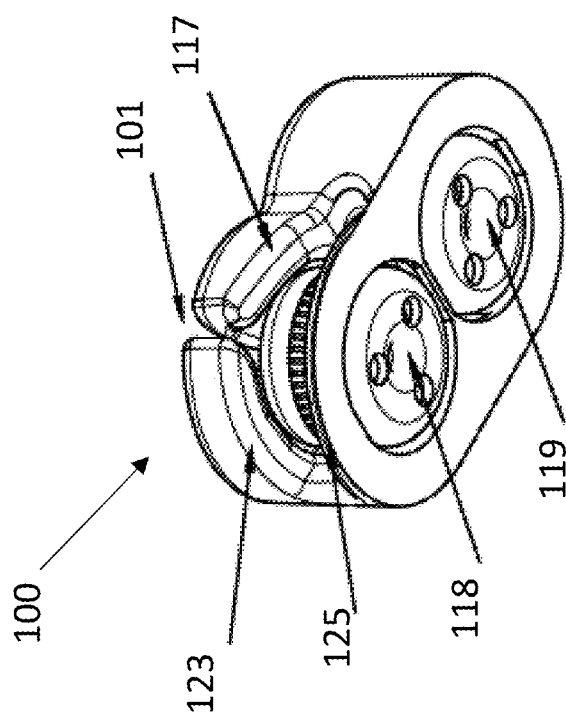
Figure 8:
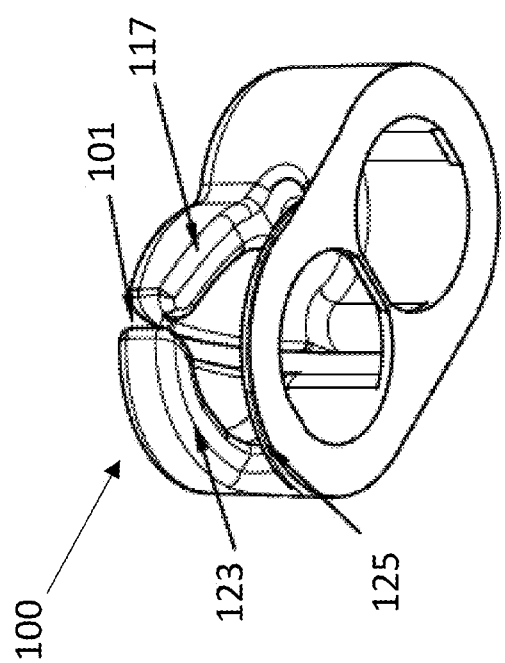
Figure 11:
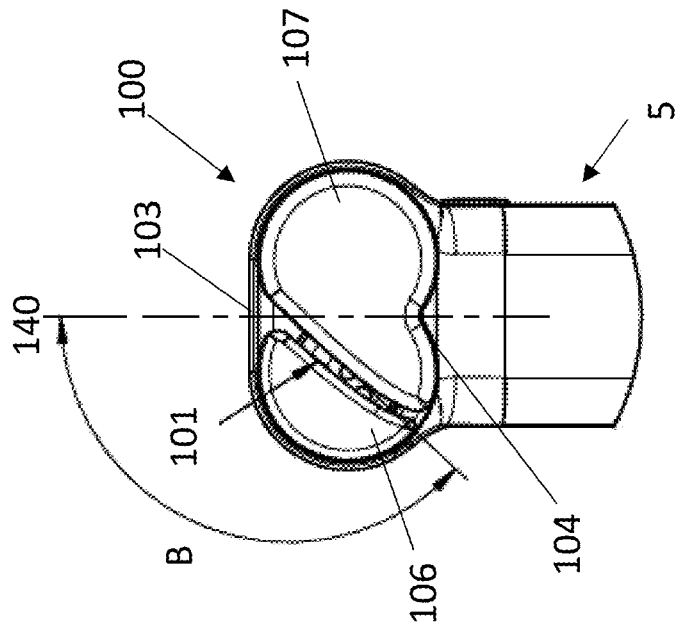
Figure 10:
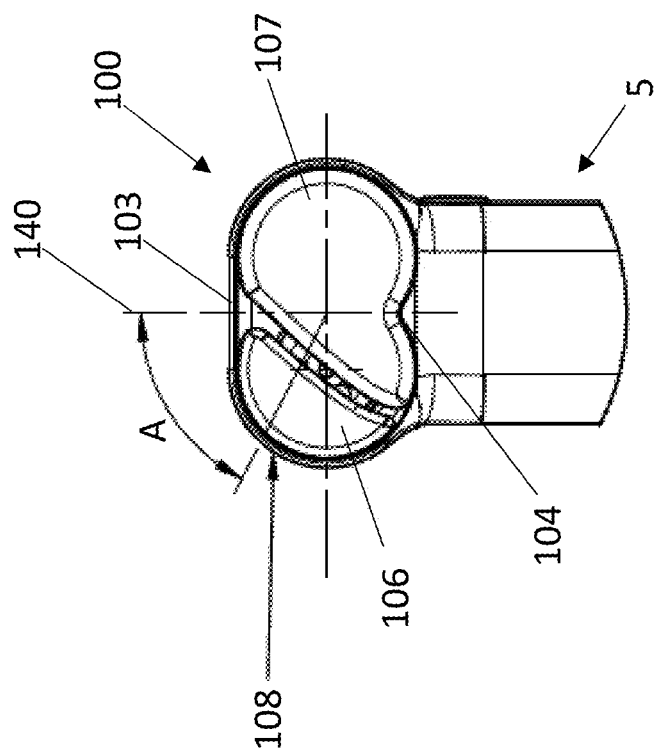
Figure 13:
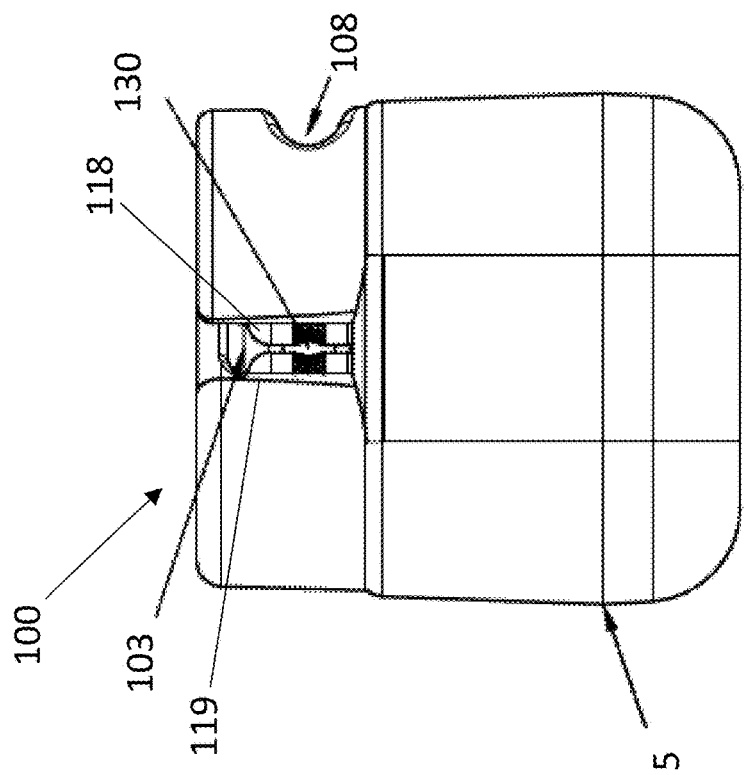
Figure 12:
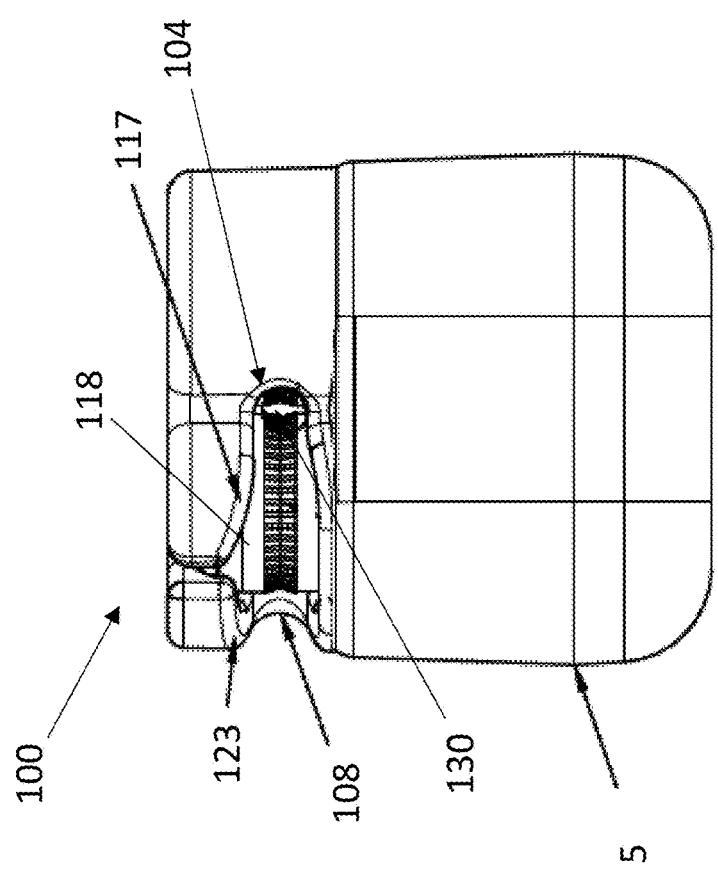
Figure 14:
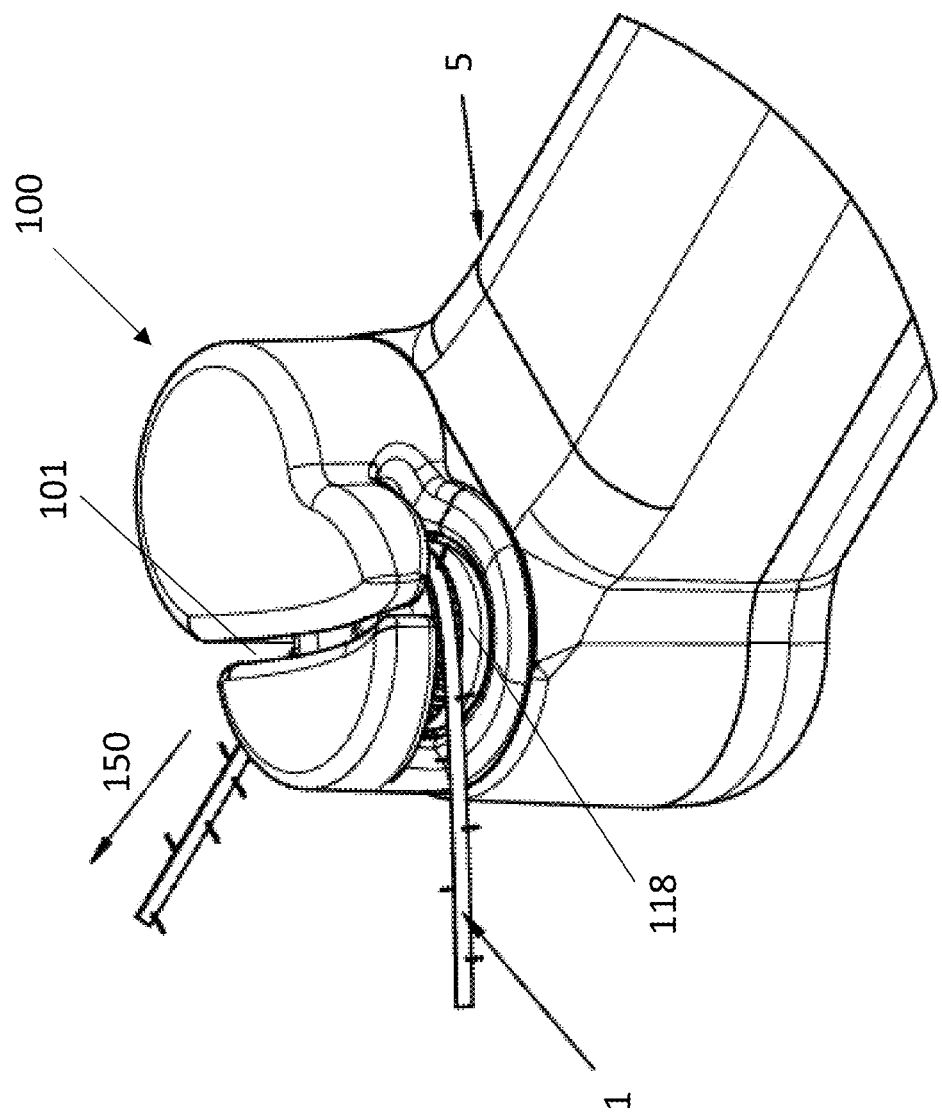
Figure 15:
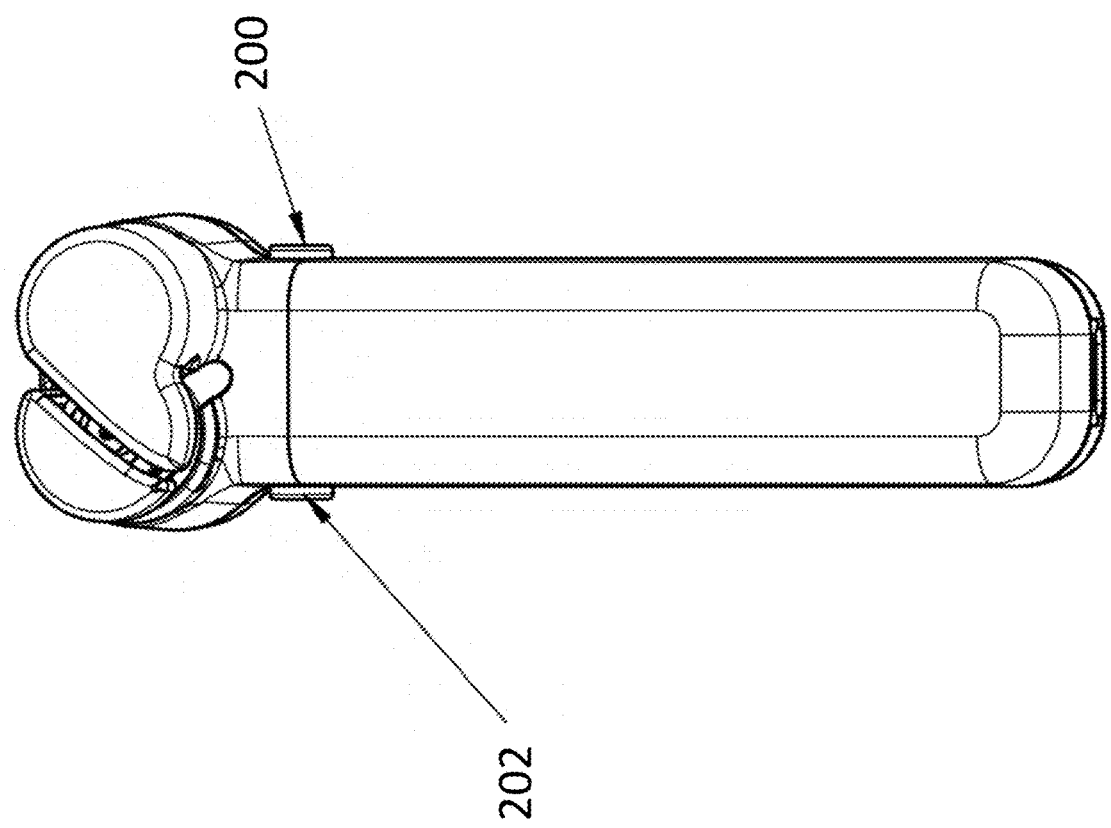
Figure 16:
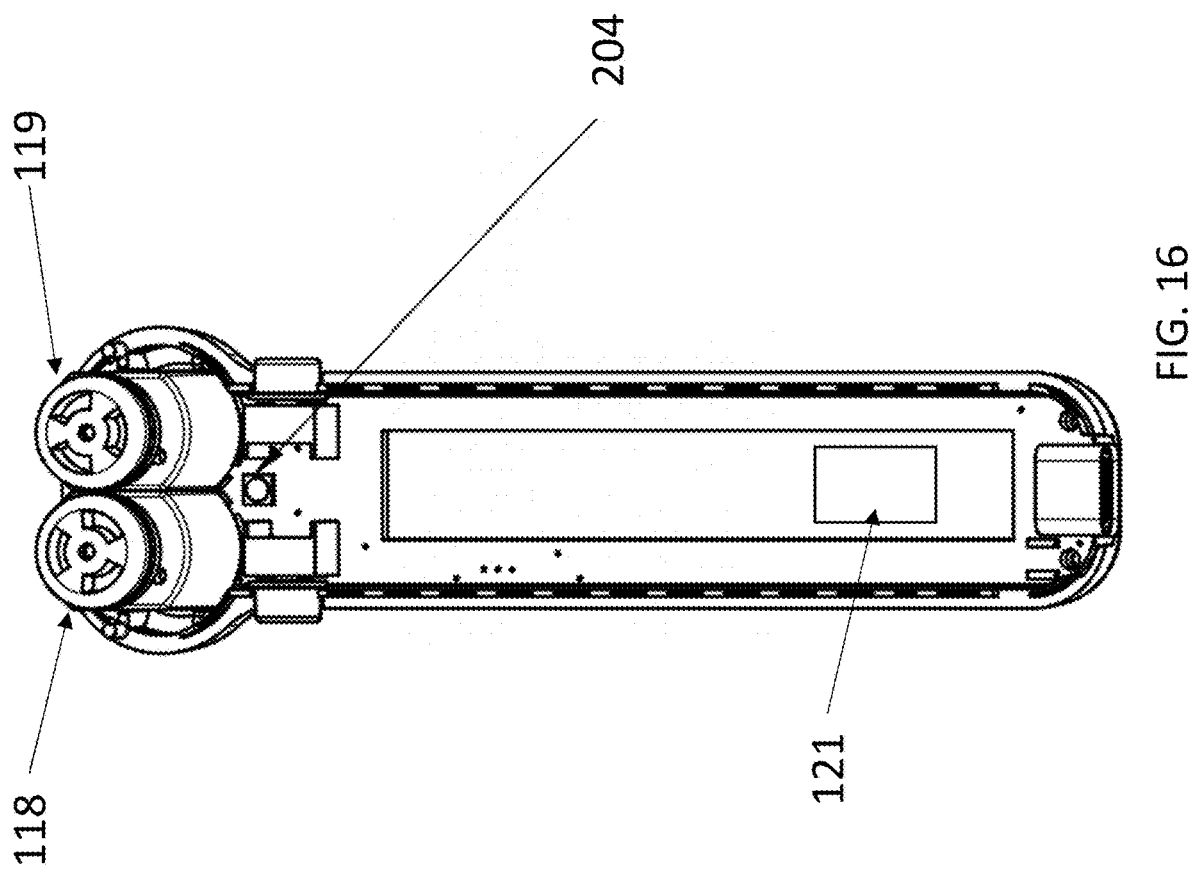
Figure 17:
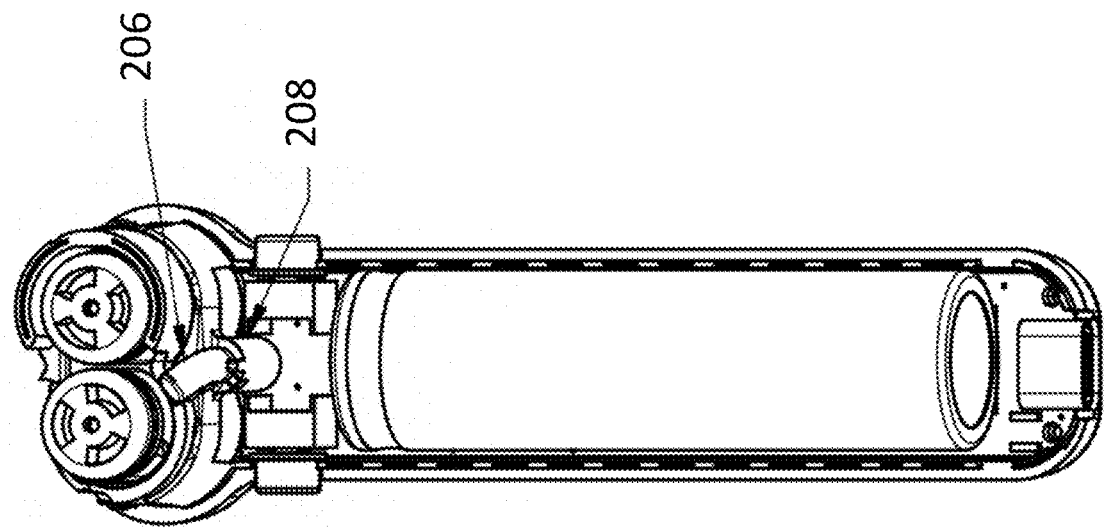
Figure 18:
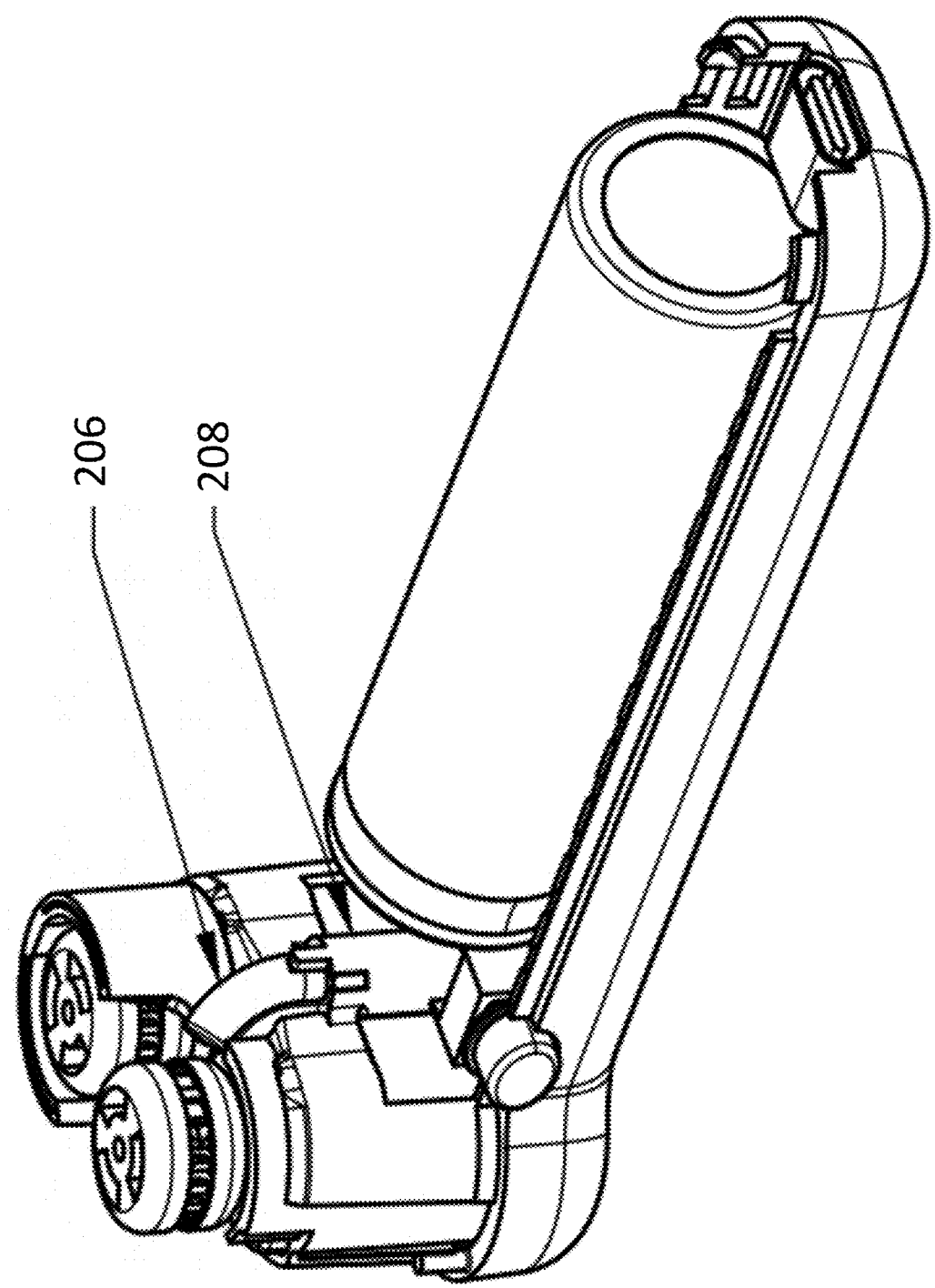
Figure 19:
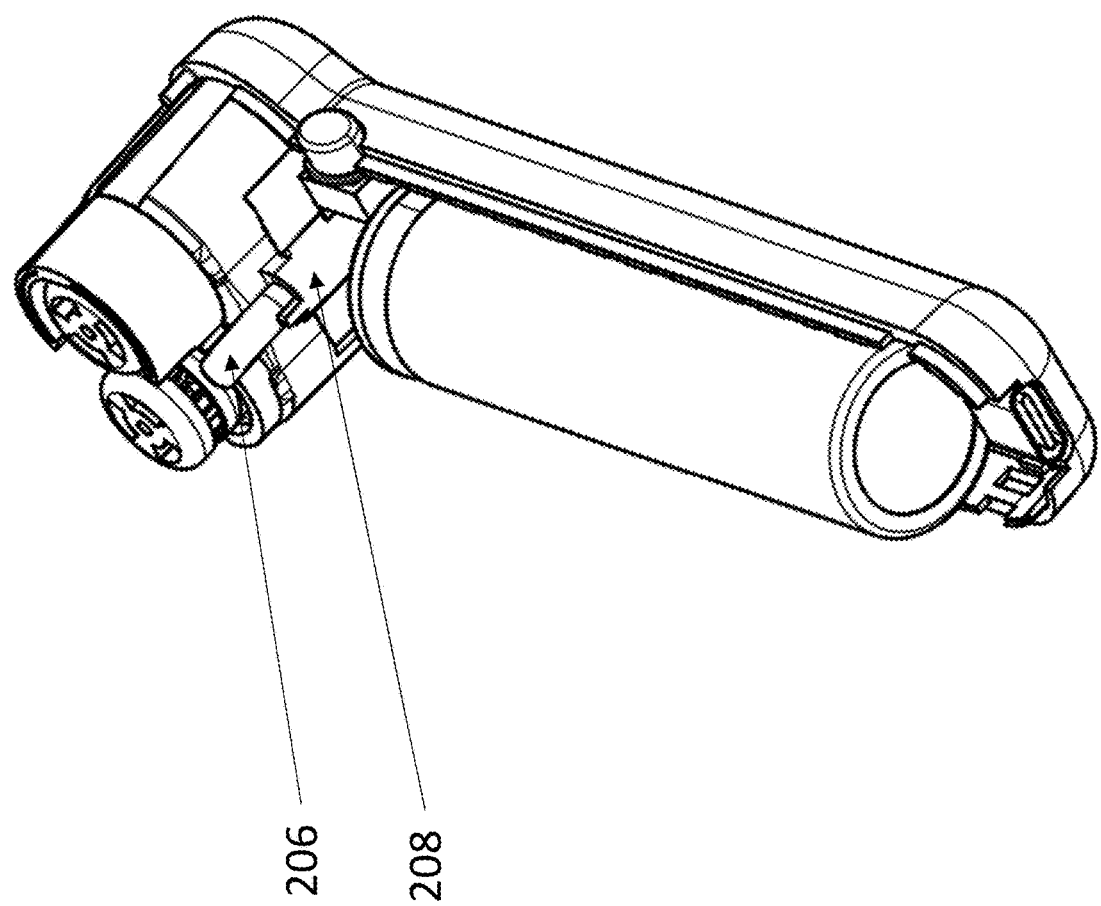
Figure 20:
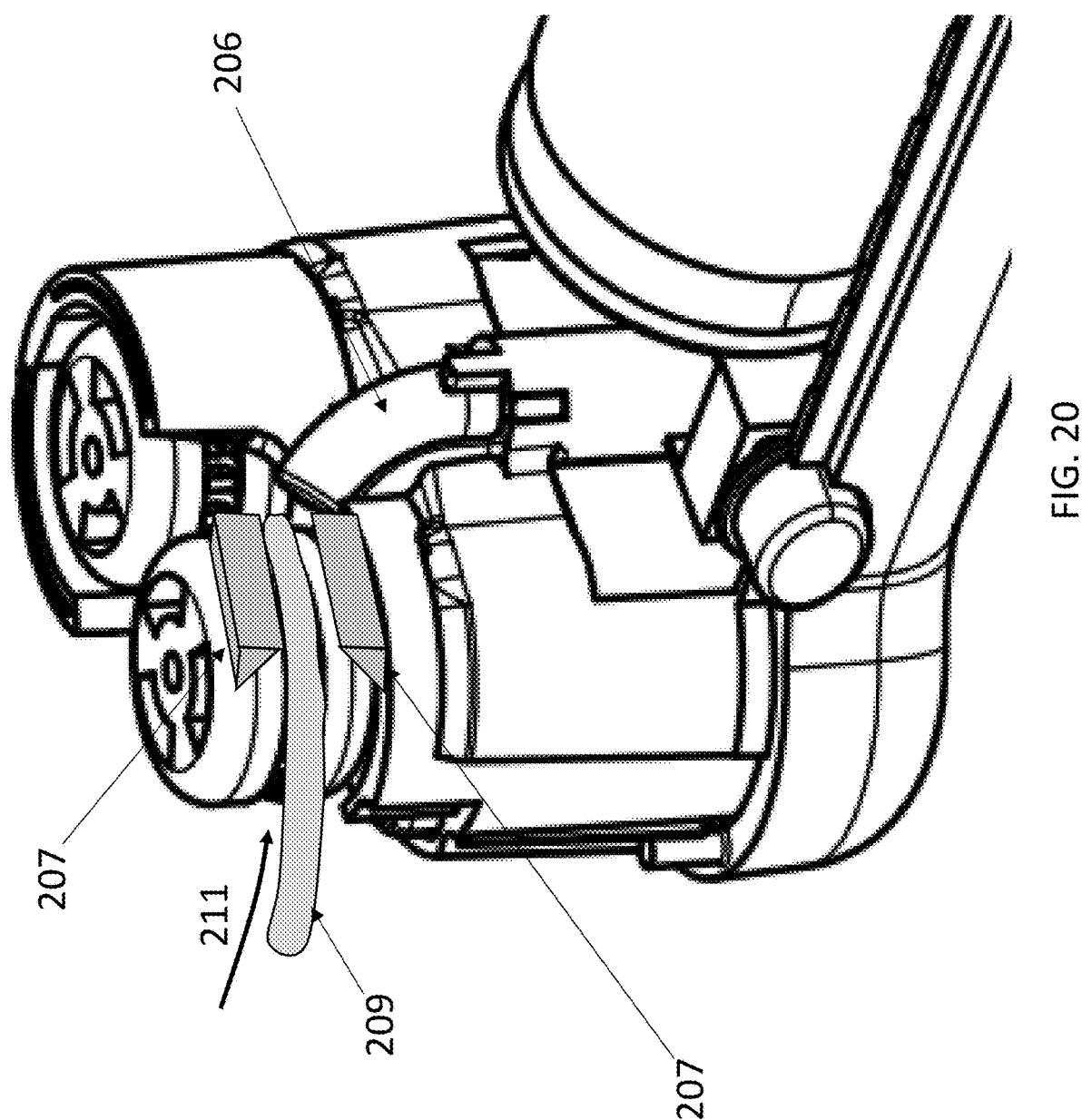
Figure 20:
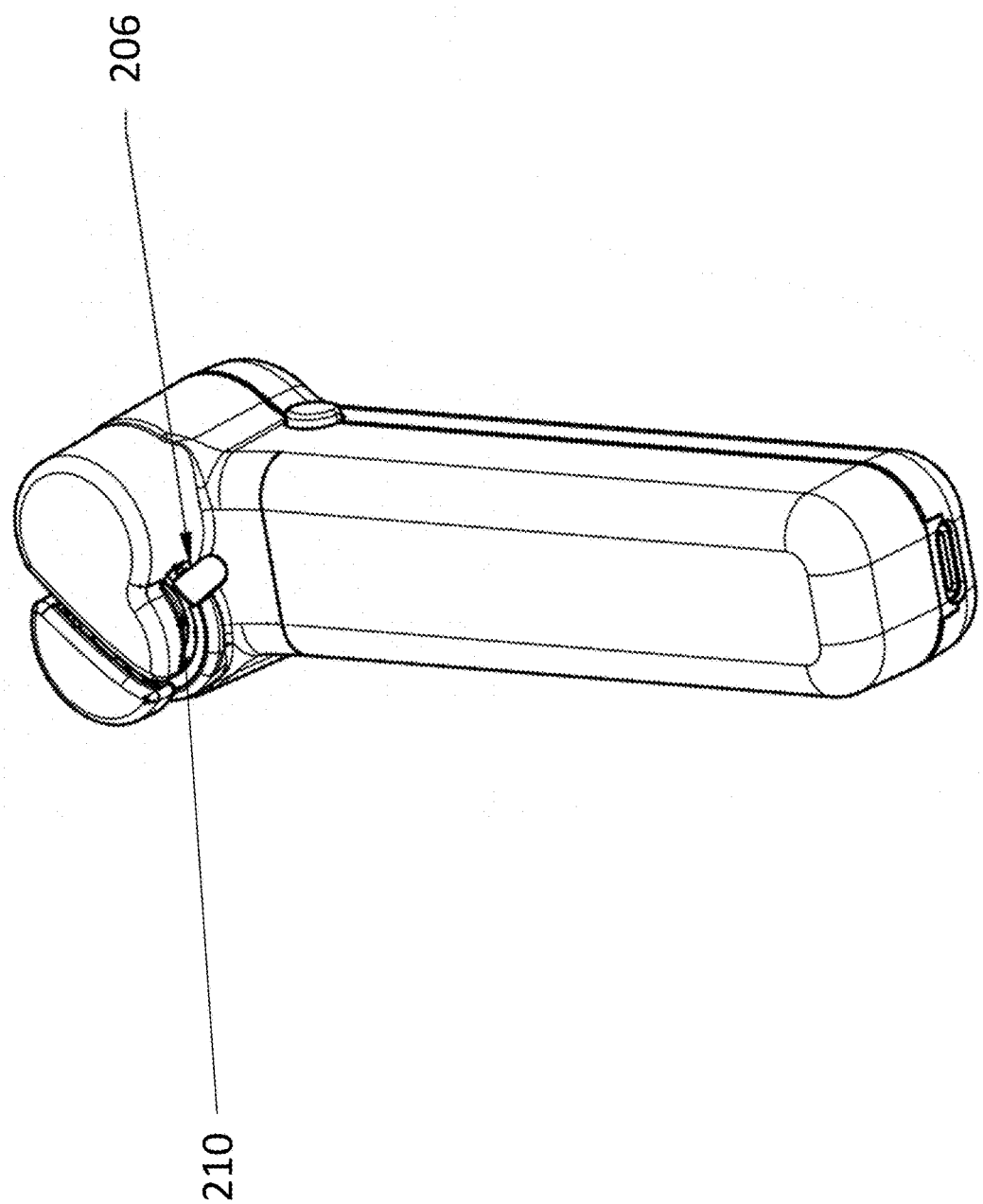
Figure 21:
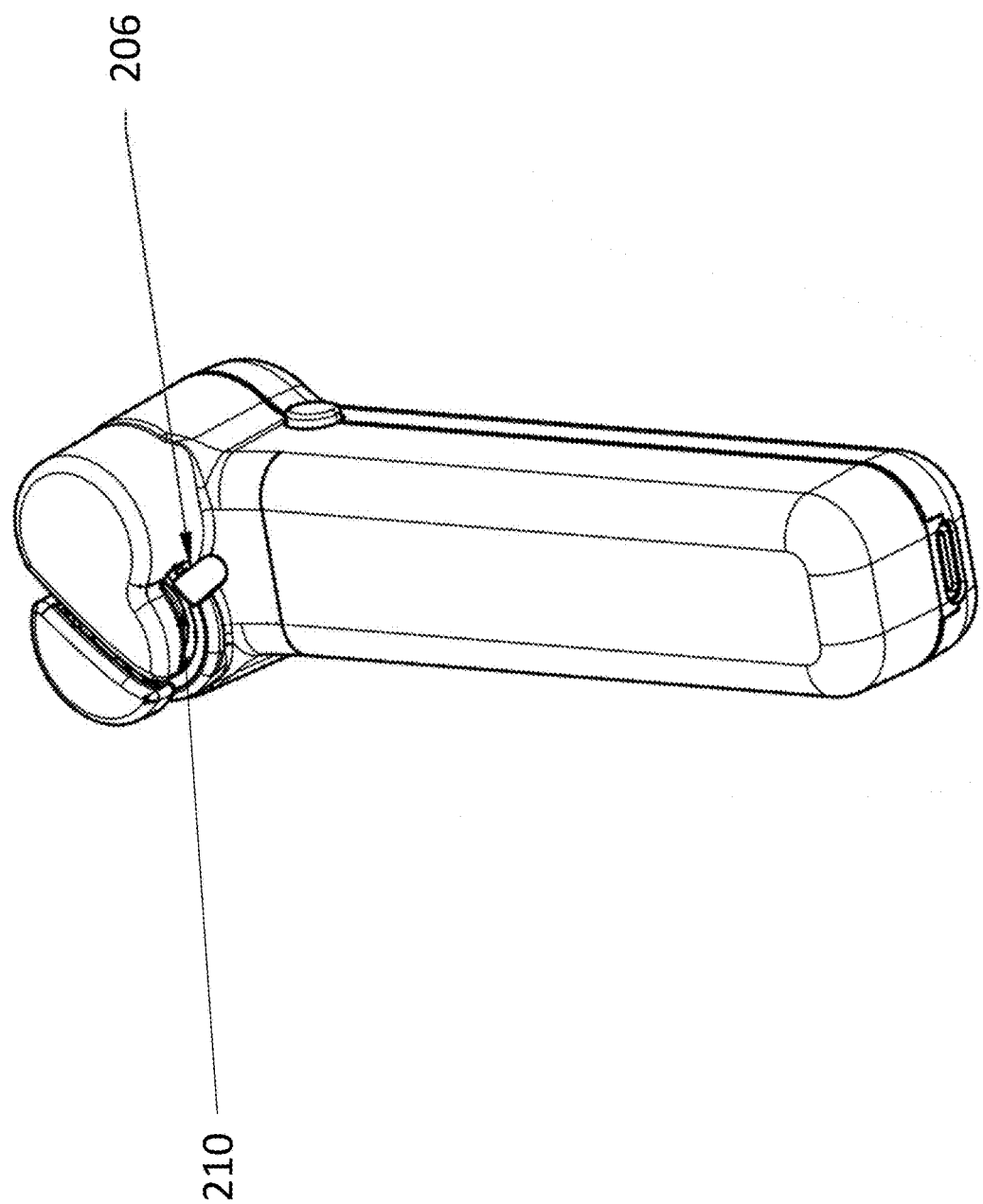
Figure 22:
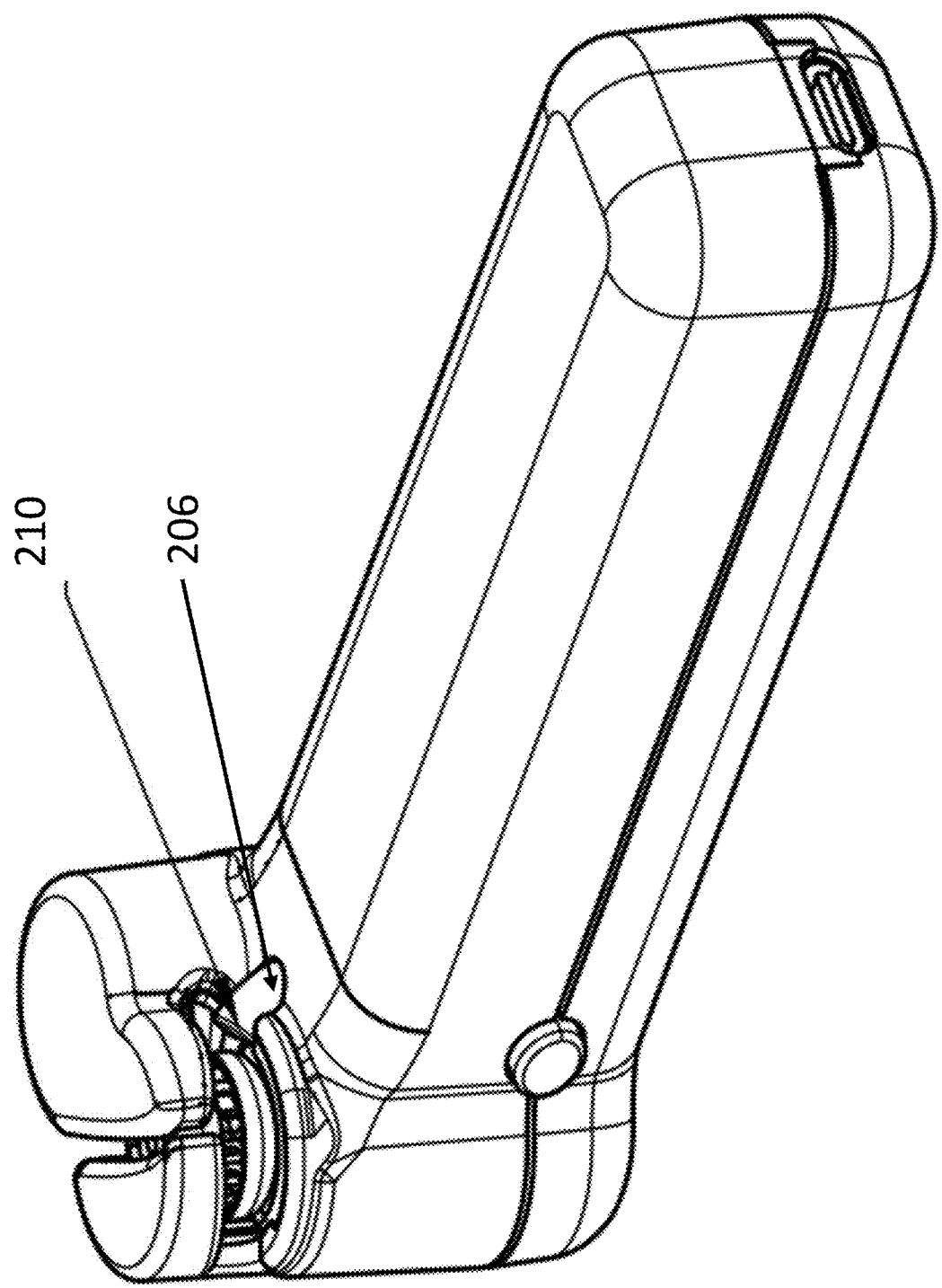
Figure 23:
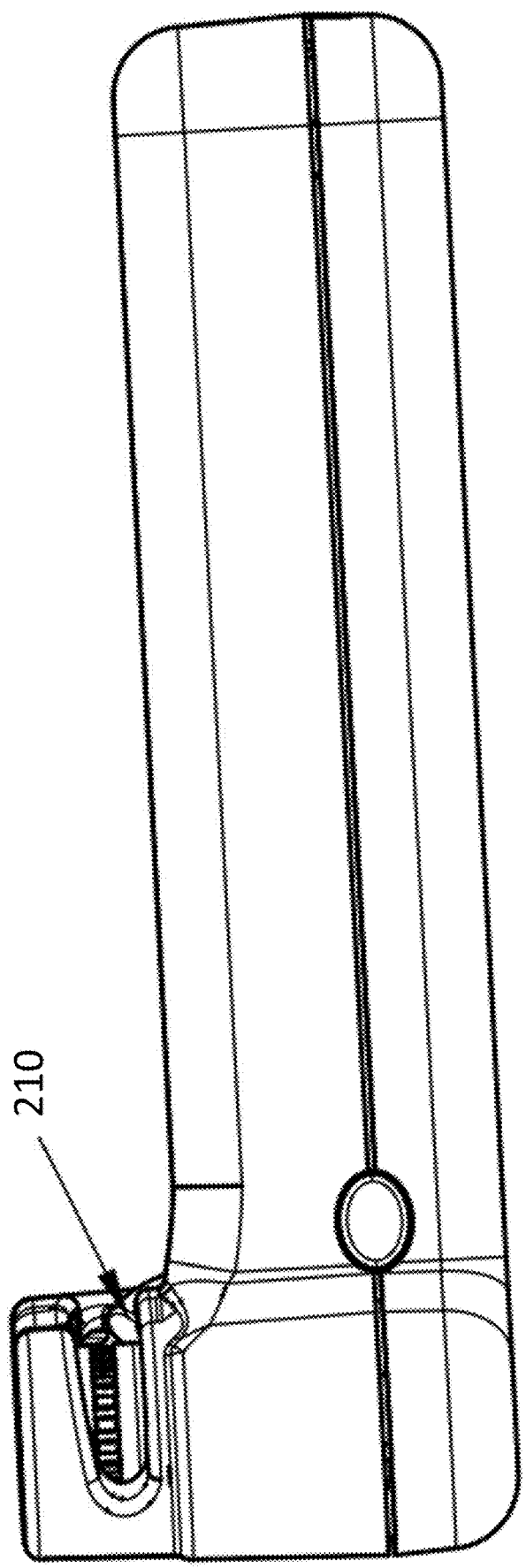

FIG. 1 illustrates a profile view of a string shooter propelling a looped string according to an example embodiment of the present disclosure;

FIG. 2 illustrates three embodiments of strings used with a string shooter according to an example embodiment of the present disclosure;

FIG. 3 illustrates a profile view of a looped string as propelled by a drive wheel according to an example embodiment of the present disclosure;

FIG. 4 illustrates a looped string of the prior art as propelled by a drive wheel;

FIG. 5 illustrates the aerodynamic effects on a string according to an example embodiment of the present disclosure;

FIGS. 6 and 7 illustrate views of a housing for a string shooter including a loading feature and guide according to an example embodiment of the present disclosure;

FIGS. 8 and 9 are additional views of the housing for a string shooter according to an example embodiment of the present disclosure;

FIGS. 10 and 11 illustrate a string shooting device including a housing according to an example embodiment of the present disclosure;

FIG. 12 illustrates a bottom view of a string shooting device according to an example embodiment of the present disclosure;

FIG. 13 illustrates a top view of a string shooting device according to an example embodiment of the present disclosure;

FIG. 14 illustrates a perspective view of a string shooting device including a housing having a guide feature according to an example embodiment of the present disclosure;

FIG. 15 illustrates a front view of a string shooting device including a light switch and power switch according to an example embodiment of the present disclosure;

FIG. 16 illustrates an oblique front view of a string shooting device including a light source according to an example embodiment of the present disclosure;

FIGS. 17-19 illustrate various oblique views of a string shooting device including a light guide and light shroud according to an example embodiment of the present disclosure;

FIG. 20 illustrates the light guide focusing light on a path of the string and a pair of reflectors to reflect leaked light back to the path of the string according to an example embodiment of the present disclosure; and FIGS. 21-23 illustrate various views of a string shooting device including a light guide and light exit point according to an example embodiment of the present disclosure.

DETAILED DESCRIPTION

Some embodiments of the present invention will now be described more fully hereinafter with reference to the accompanying drawings, in which some, but not all, embodiments of the invention are shown. Like reference numerals refer to like elements throughout. Indeed, various embodiments of the invention may be embodied in many different forms and should not be construed as limited to the embodiments set forth herein. Rather, these embodiments are provided so that this disclosure will satisfy applicable legal requirements.

As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. Thus, use of any such aforementioned terms, or similarly interchangeable terms, should not be taken to limit the spirit and scope of embodiments of the present invention.

The figures are not drawn to scale and are provided merely to illustrate some example embodiments of the inventions described herein. The figures do not limit the scope of the present disclosure or the appended claims. Several aspects of the example embodiments are described below with reference to example applications for illustration. It should be understood that numerous specific details, relationships, and methods are set forth to provide a full understanding of the example embodiments. One having ordinary skill in the relevant art, however, will readily recognize that the example embodiments can be practiced without one or more of the specific details or with other methods. In other instances, well-known structures and/or operations are not shown in detail to avoid obscuring the example embodiments.

Embodiments of the present disclosure are designed to be used in toys or gadgets that propel a continuous loop of string around a mechanically driven drive wheel at a fast rate. These toys or gadgets are referred to herein as string shooters. Embodiments of the present disclosure employ the use of a looped string that has phosphorescent particles or fibers embedded in or on the string and has high surface area derived from threads, fibers or texture which radiate out from the surface of the looped string. The phosphorescent particles, when charged by light from a light source, emit light. The surface texture of the string, when viewed closely the string could be described as "fuzzy".

Embodiments described herein include a string shooting device and a looped string that is propelled by the string shooting device. The string shooting device of example embodiments of the present disclosure include a light source that, as the string passes through the string shooting device, is focused onto at least a portion of the string thereby charging the phosphorescent particles or fibers of the string. The charged phosphorescent particles or fibers of the string emit the charged energy as visible light as the looped string is propelled through the air by a pair of wheels. Embodiments achieve a glow-in-the-dark effect when viewing the string as it emits light in a decaying fashion after it was charged by the light from the light source.

Embodiments of the present disclosure include a looped string having phosphorescent particles or fibers embedded in or on the looped string. In some embodiments, the phosphorescent particles or fibers are embedded in or on the full length of the looped string. In other embodiments, the phosphorescent particle or fibers are embedded in or on the looped string in specific patterns or sections of the string to cause different visual effects when viewing the string, particularly as the string is in motion. The phosphorescent particles or fibers of an example embodiment may be embedded in or on only a portion of the looped string, such as half of the length of the looped string, a striped pattern along the length of the looped string, a zig zag or spiral pattern, an alternating sequence of large sections and small sections of the string along its length, or any other pattern or set of sections that would cause desirable visual effects, particularly when the string is in motion.

The looped string of example embodiments can be dyed with a phosphorescent dye. The string can be dyed along the whole string, a portion of the string, or a pattern along a length of the looped string. In one embodiment, only a small portion of the looped string is dyed with a phosphorescent dye. In such an embodiment, as the string travels around its path in a dark environment, the small portion glows and can be seen traveling about the path of the string. Such an embodiment demonstrates a speed at which the string is traveling as a viewer can plainly see how that small portion of string advances.

Embodiments of the present disclosure include a string with radiating fibers or texture that when accelerated through the air, increases the air friction by expanding the turbulent air boundary layer around the string. Embodiments increase the air friction and when the string runs as a continuous loop, the string creates lift along the length of the string that is propelled outward toward the distal end of the loop. The distal end of the loop, as described herein, is the end of the looped string furthest from the drive wheel of the string shooter. Embodiments of the present disclosure generate a lift force for a rapidly moving looped string by expanding a boundary layer of turbulent air around the string. This expansion of the boundary layer is achieved by threads radiating out from an axis along which the string extends creating friction with the air or "drag" as the string moves through the air.

Embodiments of the present disclosure also have an additional feature of increasing the additive drag that accumulates along an entire length of the string loop from the point where the outgoing portion of the string leaves a drive wheel of the string shooter, along the length of the string loop to the incoming portion of the string returns to the drive wheel. This increased drag effect enhances the differences between the incoming and outgoing portions of the string loop as it relates to the drive wheel.

This friction accumulation and tension differentiation create an outgoing portion of the string from the drive wheel that is under low tension. The combination of low tension along with the lift described above create a unique effect such that the string appears to float in the air. The string under these conditions becomes highly susceptible to motions from the user. For instance, movement of the string shooter by a user can introduce waves into the floating string.

FIG. 1 illustrates an example embodiment in which a looped string 1 having radiating threads 2 is propelled by a drive wheel 3 driven by a motor 4. The outgoing portion of string 9, in relatively low tension, travels to a distal end 7 of the looped string 1 and back to the drive wheel along incoming string 8 portion which is in relatively high tension to the proximal end 6 of the looped string. The body 5 houses the power source, such as a battery, to power the motor 4 that turns the drive wheel 3. The drive wheel 3, driven by the motor 4, provides rotational acceleration to the looped string 1 via frictional engagement between the looped string and the drive wheel. The device features at least one drive wheel, and a second wheel that may be an idling guide wheel, or may be a second drive wheel, driven in an opposite rotational direction as the first drive wheel to grasp and propel the string. Preferably, the looped string interfaces only with the drive wheel 3, a second wheel, and the air around the string. According to some embodiments, the string shooter may include one or more string guides to help maintain the string in the proper orientation relative to the drive wheel as the string is propelled.

FIG. 2 illustrates several example embodiments of strings of the present disclosure, such as a monofilament string 11 with radiating threads 2, a braided string 12 with radiating threads 2, and a multifilament string 13 with radiating threads 2. FIG. 3 illustrates the effect of lift on the looped string 1, where outgoing string 9 driven in relatively lower tension is pushed through the air, such that lift created by the boundary layer of air around the string lifts the string against gravity in a positive X-direction. The effect of the "fuzzy" surface of the string magnifies the air friction thereby magnifying the positive lift against gravity. With sufficient lift, the modified string overcome gravitational forces on the distal end 7 of the looped string 1 and give the appearance that the looped string 1 is weightless. The radiating threads 2 of embodiments of the looped string extend out from the string. While threads may extend perpendicular to or orthogonal to an axis along which the string extends, the threads may extend at any angle relative to the string away from the axis along which the string extends. The threads increase a surface area of the string, and impart turbulence around the string. Thus, the orientation of the threads is not necessarily critical; however, the more they extend away from the string, the greater potential effect the threads can impart on the air around the string.

While the illustrated embodiments of FIG. 2 include radiating threads to increase friction to create lift using the boundary layer, the string of some embodiments can include woven strings having a loose weave or a loose braid. Such strings can have an effective surface that is not smooth, such that the air movement around the string creates the boundary layer as described below with respect to FIG. 5.

Another feature of embodiments described herein includes a drag introduced on the looped string 1 that alters the tension of the string along its length while the string is traveling through the air. The tension due to drag is cumulative and the greatest at the incoming string 8 and the least at the outgoing string 9. The varying tension creates a unique effect that becomes observable to the user as the bottom or incoming string 8 that is under high tension behaves differently than the outgoing string 9 that is under low tension. The bottom, incoming string 8 is taut while the top, outgoing string is more loose and slackened. The loose or slackened top outgoing string 9 is more influenced by movements of the string shooter by the user. The user's movements can be manifested as waves in the string corresponding to the user's movement of the body 5.

Embodiments of the present disclosure provide an unexpected result not found in any string driving devices previously developed. Embodiments of the string shooter described herein, together with the string of example embodiments, give the impression that the string is floating, weightless in the air. Embodiments dynamically change the path of a moving string due to the enhanced turbulence of the boundary layer, which provides a lifting effect on the string as it is driven away from the drive wheel to lift a distal end of the looped string to counter a weight of the string. Further, embodiments of the string described herein create a gradation of string tension along a path of the string. As the force of the combined air friction of the looped string approaches the tension of the string at the drive wheel, the string driven away from the device becomes slackened and more highly responsive to motion of the body.

Strings that are generally smooth have very little friction and therefore exhibit little or no lifting effect, and thus do not display the floating or weightless effect of example embodiments described herein. Further, smooth strings do not provide a sufficient tension delta between the outgoing portion of the string relative to the incoming portion of the string. Therefore, the low tension effects on the top portion of the string, when the body 5 is moved by the user, are less apparent if at all. FIG. 4 illustrates an example embodiment of a looped string 1 having a smooth profile as propelled by a drive wheel 3. As illustrated, the gravitational effects weigh down the distal end 7 since there is little-to-no lift on the string as it is propelled as outgoing string 9.

Embodiments of the present disclosure are configured to be hand-held devices, where a user holds the body 5 and turns on the motor 4 to drive the looped string 1 with the drive wheel 3. The rotational force of the drive wheel 3 drives the looped string 1 through frictional engagement. As the looped string 1 moves through the air, the radiating threads 2 create drag as they extend the boundary layer of turbulent air around the string. This aerodynamic friction created by each radiating thread becomes additive drag on the looped string. As the string begins to move downward (in the negative X direction of FIG. 3) with the force of gravity, the distal end 7 of the looped string rises with a lifting force of the string caused by the aerodynamic friction. The lifting force vector against the direction of gravity is aligned to the vertical drag component and proportionally opposite to the negative X direction vector component of the looping string. As the distal end 7 of the looped string 1 descends, more lift is induced on the string resisting gravity. When sufficient lift in the moving string overcomes the weight of the string, the string begins to hover or float in the air.

String moving in the vertical direction aligned to a positive X vector also has string drag effects. However, those effects are at the proximal end 6 of the string is supported by the drive wheel 3. The direction of the drag of a moving string would drive the proximal end 6 of the string downward; however, since the string is being supported by the drive wheel 3, the device and ultimately the user holding the device, counters the slight increase in downforce. Therefore, effects of aerodynamic forces at the proximal end 6 of the looped string 1 are substantially negated.

Horizontal direction component vectors of the string in either Y direction generally balance each other as each Y direction of the string is connected to the drive wheel 3 at the incoming string 8 portion and the outgoing string 9 portion. The floating effect at the distal end 7 of the looped string 1 is primarily caused by the negative X direction component of the string as this drives the vertical lift component in the positive X direction against gravity when using embodiments of the string described herein.

Embodiments of the present disclosure employ a looped string with radiating threads extending from the looped string to expand the turbulent boundary layer as illustrated in FIG. 5. The upper portion of the looped string (relative to gravity) must be traveling away from the body 5 for embodiments to function as described. The air friction induced by the radiating threads 2 induces a lift force on the looped string 1 when the looped string direction vector is in the negative X direction. When the looped string direction vector is negative in the X direction, the air friction force produces a positive X direction lift. The magnitude of the gravity vector (negative X) and lift vector (positive X) are proportionally opposite to each other. At any point of the string moving in the negative X direction has a substantially equal and opposite lift component.

The lifting force at the distal end 7 of the looped string 1 changes the shape of the looping string as well as its apparent effects to a viewer. With sufficient friction provided by the radiating threads 2 of embodiments described herein, the distal end of the looped string overcomes the force of gravity on the distal end and gives the appearance of the string hovering in air. Further, a looped string that is monochromatic or has no apparent visual distinctions along its length can give the appearance of the string being static—not moving at all along the axis of the string while simultaneously appearing static or floating in the air. This visual effect defies conventional logic and produces a stunning visual effect.

As noted above, embodiments described herein include a string with radial threads or fibers to create the dynamic effects on the shape of the looped string, particularly at the distal end 7 as it creates lift. The induced drag also alters tension on the string along its length while the string is traveling through the air. The varying tension creates a unique effect that becomes observable to the user as the bottom or incoming string 8 that is under high tension behaves differently relative to the top or outgoing string 9 portion that is under low tension. The incoming string 8 is taut while the outgoing string 9 is more loose and slackened. The loose and slackened string is much more influenced by movements of the body 5 by the user. The user's movements can be manifested as waves in the string corresponding to the user's movement of the body.

The lift at the distal end 7 of the looped string reduces tension on the outgoing string 9 as the distal end of the string is rising, such that string being propelled out of the device is carried, at least in part, by the lift of the distal end 7. Conversely, the incoming string 8 being drawn into the device is being pulled in a relatively higher tension. The relatively lower tension on the outgoing string 9 and the relatively higher tension on the incoming string 8 cause the two different portions of string to behave differently, particularly in response to movement of the body 5. The lower tension outgoing string 9 responds to movement at a slower pace, and waves induced in the outgoing string propagate in a more pronounced manner than waves on the incoming string 8. The higher tension on the incoming string 8 pulls the string and reduces the effects of waves and motion on the incoming string.

As noted above, the outgoing string 9 is lifted by virtue of the lift of the distal end 7 imparted by the surface texture of the string. The string exiting the device is driven or propelled by a drive wheel; however, as the string is relatively light weight, the inertia of the string is relatively low. The string of example embodiments moves at a high speed (e.g., around 30-40 miles per hour) while having both high drag or air resistance, and a relatively low weight. So while momentum does factor in to the unique shape and behavior of the looped string of example embodiments, the momentum alone cannot produce the lift and floating effect of example embodiments. Thus, the outgoing string 9 does not rely exclusively on momentum to "float" in the air, and a device that uses only the weight of the string to propel the string from such a device cannot achieve the floating effect of the outgoing string. Conversely, a device relying upon momentum of the string to propel the string outwardly behaves differently than embodiments described herein, as the outgoing string of such a device would not be under a substantially lower tension than the incoming string. Thus, a string lacking the surface texture described herein and/or being relatively heavier would behave very differently. Embodiments described herein employ a string with a sufficient surface texture to provide lift to the string and to overcome a weight of the string. The string of example embodiments therefore has a balance between the surface texture and lift created therefrom, and a weight of the string.

Embodiments of the present disclosure create a string configured to operate as described above through abrading a surface of a substantially smooth string over a rough surface, such as a sanding drum, to tear or wear small fibers from a core of the string. Abrading techniques can include sandpaper held by and around the string as the string is pulled through the sandpaper. A string can optionally be pulled over a sharp edge that breaks or tears small fibers from the main core, but does not completely cut the string. Many abrading techniques can be employed and an exhaustive list of those techniques is not provided herein. Use of a highly braided string can also provide sufficient drag that can lift the string when propelled at rapid rates.

Looped strings with radiating threads can be manufactured without abrading with loose fibers that extend beyond the surface to create radiating threads. Radiating threads do not need to be uniform and may not be actual fibers. For example, a monofilament looped string can be sprayed with a heavy texture that extends from the surface which serves to create a large boundary layer and functions as the threads described above.

Looped strings of example embodiments can be made from synthetic fibers, such as nylon or polyester. Strings can be made from natural fibers such as cotton or wool. Many different materials can be used beyond those described herein. Looped strings can be manufactured with multiple string types interwoven together. For example, one material with long strands forming the bulk of the string and another material interwoven with short fibers that radiate out from the string. The length and thickness of the radiating threads or fibers need not be uniform.

The premise behind the general function of the string shooter of example embodiments is described above; however, embodiments include additional features that improve and enhance the functionality. Ease of use together with reliability of the devices described herein are important for customer and user satisfaction. To that end, embodiments include features to improve loading of a looped string into the device and to enhance stability of the looped string while operating the device. The loading mechanism described herein functions as a guide to guide the looped string into the device and into engagement with the drive wheel.

Embodiments of devices described herein include a device body 5 with a housing ggs that covers a pair of wheels, where the pair of wheels includes a first wheel and a second wheel. At least one of the pair of wheels is a drive wheel, while the other of the pair of wheels can be driven or be an idling guide wheel. The housing 100 allows the looped string to be loaded through an oblique loading slot 101 that has specific tolerances based on the size of the looped string that is compatible with the device. This loading slot 101 guides the looped string to fit into a gap between the pair of wheels. The slot of an example embodiment includes a curved shape to provide an easy way to load the looped string to a correct position within the string shooting device, while resisting accidental removal of the looped string through the slot.

As shown in FIG. 6, the loading slot 101 of an example embodiment transitions into an exit aperture located where the looping string exits the pair of wheels. The looped string enters the intake aperture 104 and exits the exit aperture 103. A loading tab 102 includes a tip that is relatively thinner than a body of the loading tab, where the loading tab 102 functions as a ramped guide to guide the string from the loading slot to the intake aperture 104. This loading tab feature adds protection against the looped string sliding off of the drive wheel during operation, and leads the looped string into the intake aperture 104 while loading the looped string into the device.

According to embodiments described herein, a user is able to insert the looped string into the loading slot 101 and slide it across a top of a first wheel 118 to fit between the pair of wheels. While embodiments described herein reference a drive wheel and a guide wheel, either or both wheels can be driven and such embodiments would not depart from the description herein. The loading feature is configured to facilitate the quick and easy swapping of looped strings while also securely holding the looped string between the wheels when the device is operating.

The housing 100 features an integrated guiding slot 108 which, when in operation, allows the returning part of the looped string to approach the drive wheel and fit into a groove found in one or both of the drive wheel and the guide wheel. The guiding slot and the wheels are configured such that when the device is in operation, the looped string is propelled by the wheels in a relatively low friction state. The guiding slot and the wheels are designed to maintain the looped string propelled by the drive wheel, while seldom making contact with the looped string. The guiding slot generally will touch the looped string when gestures are made by a user of the device that causes movement of the looped string relative to the housing 100 in a direction orthogonal to an axis along which the string extends. Such movement causes the looped string to move relative to the wheels, while the guide slot urges the string back to the operational position between the drive wheel and the guide wheel. Edges of the guiding slot 108 are curved to minimize friction between the edges and the looped string when contact is made.

FIGS. 6-9 illustrate the housing 100 that is configured to receive therein wheels for propelling a looped string. The housing 100 includes a loading slot 101 dividing a left wheel cover 106 from a right wheel cover 107, where the right wheel cover 107 extends at least partially over both wheels. The loading slot 101 opens to an aperture that extends from a front guiding slot 108 to the intake aperture 104. The aperture from the guiding slot 108 to the intake aperture 104 is configured to expose a substantial (greater than 50%) portion of the periphery of a first wheel 118. The exposure of the periphery of the first wheel 118 enables greater freedom of movement of the looped string when it travels in the loop. Movement of the body 5 of the device in a direction orthogonal to the axis of rotation of the first wheel 118 can result in contact between the string and a greater portion of the first wheel 118, as the groove 120 in the first wheel 118 guides the string between the two wheels of the device. This promotes propulsion of the looped string as it avoids the string contacting a stationary portion of the housing during operation, which induces friction that can potentially slow the looped string.

The loading slot 101 of the housing 100 further includes an exit aperture 103 from which the propelled looped string exits the device. A looped string is loaded into the loading slot 101 and dragged across the top of the first wheel 118 to be received between the two wheels of the device. The housing 100 includes a guiding tab 105 on the left wheel cover 106 and a loading tab 102 on the right wheel cover 107. Both the loading tab 102 and the guiding tab 105 have no sharp edges that can abrade the looped string. Further, as shown in FIG. 7, the aperture includes a bottom guiding slot curvature 125 and a top guiding slot curvature 123. These curved edges further promote maintaining the looped string in contact with the first wheel 118 during operation while avoiding any sharp edges. The loading tab 102 includes a loading tab curvature 117 that serves the same purpose.

As shown, load slot 101 extends across a top of a first wheel 118, which may be a drive wheel or an idler/guide wheel. This slot does not align with the path of the looped string during operation of the string shooter as the offset between the load slot 101 and an operational position of the looped string helps preclude the looped string from inadvertently becoming detached from the device. The housing 100 further provides covering for the wheels including a left wheel cover 106 and a right wheel cover 107. These covers improve the safety of the string shooter device by limiting contact between a user and the wheels within the housing 100. The loading slot 101 connects with the exit aperture 103 on a front and intersects with the guiding slot 108 on a back side of the left wheel housing of the illustrated embodiment.

The loading slot 101 features a loading slot curvature 114 which precludes the looped string from getting back fed into the wheel housing while the string shooter is in operation. The angle of the oblique loading slot is specifically configured to provide ease of loading of the looped string while avoiding tangling and loss of performance of the propelled string during operation. The angle of a line extending at a center of the oblique loading slot 101 and a line that connects the center of the exit aperture 103 and the intake aperture 104 is around 137 degrees with a tolerance of around 10%. The loading tab 102 on the right side of the loading slot 101 features a loading tab curvature 117 which renders the loading tab relatively thinner proximate the loading slot 101 and relatively wider at the intake aperture 104. The loading tab profile 112 is shown narrower closer to the loading slot 101 and wider closer to the intake aperture 104. The intake aperture aligns with the grooves 120 within the drive wheel and the guide wheel. The edges of the loading tab 102 are curved as is the intake aperture 104 to reduce friction between the looped string and the housing 100. Any sharp edges can abrade the looped string and weaken the string which can lead to breakage.

The loading slot 101 of example embodiments provided herein provides a mechanism by which a user can load and unload a looped string from the device quickly and easily. This allows a user to use different looped strings (e.g., different lengths, different colors, etc.) or to replace damaged strings without having to cut and re-attach the string ends together. Looped strings that do not require severing of the loop inherently have an improved structural integrity and thus can have longer life. Further, attaching string ends together produces an anomaly in the weight of the string at the point of attachment which adversely affects performance of a string through a string shooting device as described herein. The loading slot 101 allows a user to thread a looped string through the loading slot 101, across a top of the first wheel 118, and into the gap between the wheels. The loading tab curvature 117 helps guide the looped string across the top of the first wheel 118 and into the gap between the wheels. The angle of the loading slot 101 and the shape of the loading tab curvature 117 also preclude the looped string from inadvertently exiting the device. The portion of the loading slot closest to the intake aperture 104 is further away from the gap where the looped string travels during use of the string shooter such that incoming string does not risk being caught within the loading slot 101, which could dislodge the looped string from the gap. Thus, the loading slot 101 described herein is uniquely suited to ease of loading and unloading, while maintaining the looped string between the wheels during operation.

FIGS. 8 and 9 illustrate the housing 100 detached from the device body 5 illustrating the interface with the body. FIG. 8 shows the housing without the first wheel and 118 second wheel 119, while FIG. 9 illustrates the wheels in place. FIG. 10 illustrates an example configuration of the housing 100 where the guide slot 108 extends about an outer surface of the left wheel cover 106 to within an angle A of the exit aperture 103. The angle A may be in the range of about 45 degrees to 90 degrees, but is preferably around 65 degrees. This enables the exposed area of the first wheel 118 to be about 90 degrees to about 135 degrees, but is preferably around 115 degrees, which promotes contact between the first wheel and the looped string even as the body 5 moves relative to the string, particularly within a plane orthogonal to an axis of the first wheel. The axis 140 illustrates the line between the intake aperture 104 and the exit aperture 103, through a gap between the first wheel 118 and the second wheel 119. FIG. 11 illustrates the angle B between the exit aperture 103 and an opening to the loading slot 101. This angle is found to facilitate easy loading of a looped string into the device and threading of the string to between the first and second wheels. This angle further reduces the likelihood of the looped string disengaging from the loaded position between the first and second wheels. Angle B is selected in the range of about 100 degrees to about 145 degrees, and is preferably about 117 degrees.

FIGS. 12 and 13 illustrate the device including the body 5 and the housing 100. FIG. 12 is from a perspective at a base of the body 5 looking up the body into the intake aperture 104, while FIG. 13 is from a top perspective looking down into the exit aperture 103. Visible in both FIGS. 12 and 13 is a gap 130 between the first wheel 118 and the second wheel 119. The gap 130 is formed between the grooves 120 of the respective wheels. The gap is sized to be smaller than an outer diameter of the looped string, though not substantially smaller. The wheels are not used to compress the string, but to frictionally engage the string at the grooves to propel the looped string through the gap 130.

FIG. 14 illustrates a device including the body 5 and the housing 100 with looped string 1 threaded into a loaded position. The looped string 1 is propelled along the direction of arrow 150. FIG. 14 illustrates how the looped string 1 extends around a portion of the first wheel 118, by virtue of the guide slot 108 extending around and permitting access to the first wheel.

The looped string of an example embodiment can have phosphorescent particles embedded therein and/or phosphorescent fibers forming at least a portion of the string. Such a string can be charged by light and glow in response to being charged. In a darkened environment, the string can emit its own light to have a unique visual effect. The charging of the phosphorescent particles and/or fibers of the string can be performed in a variety of ways. However, a preferred method as described herein includes charging the phosphorescent particles using the string shooting device itself. To accomplish this, the string shooting device of example embodiments can include a light within the housing configured to direct light to a location on a path along which the looped string travels.

FIG. 15 illustrates a string shooting device configured for shooting a looped string having phosphorescent particles and/or fibers. While the device of FIG. 15 can be used with non-glowing strings, the embodiment of FIG. 15 is particularly configured with a light source that is able to charge phosphorescent particles and/or fibers of a looped string. As shown, the string shooting device of FIG. 15 includes a power switch 200 and a light switch 202. The power switch 200 of an example embodiment is a togglable switch that a user may press, touch, slide or generally interact with to toggle between states. Power switch 200 includes at least an on state and an off state. When power switch 200 is toggled to an on state, at least one of the at least one motorized wheels of the device is engaged to propel a looped string through the air. When power switch 200 is toggled to an off state, at least one of the at least one motorized wheels of the device is disengaged and ceases propelling the looped string through the air.

In some embodiments, light switch 202 is a manually togglable switch that a user may press, touch, slide or generally interact with to toggle between states. Light switch 202 includes at least an on state and an off state. According to an example embodiment, when light switch 202 is toggled to an on state, a light source of the device is engaged and emits light. When light switch 202 is toggled to an off state, the light source of the device is disengaged and ceases emitting light.

In other embodiments, light switch 202 is an ambient light sensor that senses the ambient light conditions around the device and automatically toggles between states in response to the sensed ambient light conditions. In an example embodiment, light switch 202 is an ambient light sensor with a predetermined threshold. Light switch 202 may then toggle the device function to a different state in response to sensing that the ambient light levels have satisfied the predetermined threshold.

In some embodiments, power switch 200 and light switch 202 are dependent. For example, in an embodiment, light switch 202 is dependent upon power switch 200 such that, if power switch 200 is toggled to an off state and light switch 202 is toggled to an on state, the light source will not be engaged unless the power switch 200 is toggled to an on state. In other embodiments, power switch 200 and light switch 202 are independent. For example, in an embodiment, light switch 202 is independent from power switch 200 such that, if power switch 200 is toggled to an off state and light switch 202 is toggled to an on state, the light source will be engaged.

FIG. 16 illustrates an oblique front view of a device including light source 204 seen fixed proximate to wheels 118 and 119. In an example embodiment, light source 204 is controlled by light switch 202. Light source 204 may be an LED, high power LED, ultraviolet light, incandescent, laser, fluorescent, or any other kind of light source capable of emitting light absorbable by phosphorescent materials. FIG. 16 further includes a communication interface 121 as will be described further below.

Light source 204 is configured to emit light in response to light switch 202 being toggled to an on state. Light source 204 is positioned to direct the light emitted from light source 204 directly onto a travel path of the looped string having phosphorescent particles or fibers embedded in or on it. When the light emitted from light source 204 shines on the looped string, the phosphorescent particles or fibers absorb the light emitted from light source 204. Once light has been absorbed by the phosphorescent particles or fibers the absorbed energy from the light will cause the phosphorescent particles or fibers to emit light from the looped string causing a glowing effect to be visible when viewing the looped string in a relatively dark environment. In an example embodiment, light emitted from light source 204 is absorbed by phosphorescent particles or fibers embedded in or on the looped string as the looped string passes through housing 100 (shown in FIG. 14). In low-lit areas, as the string shooting device propels the string and the absorbed energy is emitted, the looped string appears as though it is self-illuminated.

The light may shine constantly on the path of the string in some embodiments, or may illuminate only to charge a portion of the phosphorescent string. The light may pulse at a predefined rate that causes the light to only charge a specific portion of the string each time it passes through the drive wheels. This pulsing may be established based on a speed of the driven wheels and a known length of the string, which can enable the same portion or portions of the string to be illuminated at each pass through the string shooting device. Alternatively, the string can include one or more triggers that prompt the light to illuminate at specific times to correspond with specific portions of the string. For example, the string can include therein a small portion that is of a different color than a main portion of the string. This small portion may be detected by a photo eye sensor, and thus index the looped string relative to the string shooting device. In this way, the length of the string does not need to be known to still achieve illumination along specific portions of the string repeatedly. A photo eye may optionally be used to detect a charged, glowing portion of the string as it enters the housing, whereby the glowing portion may prompt the light source to be illuminated to further charge the already glowing portion. This process can ensure that a pattern of glowing areas on a string can be maintained as the looped string is propelled by the string shooting device.

Optionally, the looped string of example embodiments can include a code embedded therein, such as with a pattern of markings along the string in a manner similar to a barcode. Such a code could be read by the string shooting device, such as by a photo eye, to identify properties of the string and to provide illumination of the phosphorescent looped string in the appropriate locations.

In some embodiments, a light guide and/or a light shroud may be configured to respectively focus and and/or strategically conceal light emitted from light source 204. FIGS. 17-19 illustrate a device with light guide 206 and light shroud 208 configured around light source 204. Light guide 206 is configured to guide and focus the light emitted from light source 204 onto at least part of the path of the looped string. Light guide 206 may comprise any optical medium such as glass, optical fiber, one or more lenses and/or the like to focus light emitted from light source 204 onto a focal point of the path of the looped string. In an embodiment, when charging the phosphorescent particles or fibers embedded in or on the looped string, light guide 206 may be used to increase the efficiency and/or efficacy of the light charging process. In another embodiment, light guide 206 may allow for flexibility in the configuration of the device and relative location of light source 204 since light guide 206 may route and direct light emitted from light source 204 regardless of where light source 204 is located.

FIG. 20 illustrates an additional feature that can enhance the illumination and thus charging of the string. As shown, the light guide 206 supplies light to the path along which the string (a portion of which is shown at 209) passes in direction of arrow 211. As the light may escape about the string 209, that light may be lost energy. However, embodiments can employ light reflectors 207 or light collectors (not shown) which reflect light that may leak around the string 209 back onto the string, thereby increasing the degree of charging that occurs. Light reflectors may be in the form of planar or curved surfaces that reflect the light from the light guide 206, while light collectors may include more complex surface shapes, such as parabolas to collect, focus, and return the leaked light to the string. Optionally, the light guide 206 itself can be replaced with one or more reflectors and/or collectors to direct the light from the light source to the path of the string. This method can enhance the charge of the phosphorescent particles and increase the amount of light emitted from the string as it exits the string shooting device.

As noted above, light shroud 208 may be configured to strategically shroud light emitted from light source 204. In an embodiment, light shroud 208 is configured to shroud the connection between light source 204 and light guide 206 so that there is effectively no light exposure in excess to the light directed by light guide 206 onto the looped string. In another embodiment, light guide 206 is not used and instead, light shroud 208 is configured to shroud the light source 204 so that no light in excess of the light focused onto the path of the looped string is seen when viewing the device. The effect of light shroud 208 is such that when a user views the device there is little to no perceivable light emitted from the device except for the light emitted from the looped string as it travels outside the device. This masking of the light source further enhances the visual effect of the glowing string as it is propelled by the device and appears to float in the air, while emitting light. In a relatively dark environment, this provides an enhanced view of the string and adds to the user and viewer enjoyment.

FIGS. 21-23 illustrate various views of the device and light exit point 210 from which light exits light guide 206. In embodiments with at least light guide 206 configured to focus light emitted from light source 204, light guide 206 has light exit point 210 from which light shines directly onto the path of the looped string and charges phosphorescent particles or fibers embedded in or on the looped string as it passes by the light exit point 210. In some embodiments, light emitted from the light source 204 may exit the light guide 206 at the light exit point 210 and shine directly onto the looped string as it returns through guiding slot 108. As the looped string passes through the guiding slot 108, light exiting light exit point 210 shines directly onto the looped string charging the phosphorescent particles or fibers embedded in or on the looped string. As the looped string is propelled by wheels and exits the housing, the now-charged phosphorescent particles or fibers emit the light released from the charged particles or fibers, causing the looped string to appear self-illuminated. In some embodiments, the body further defines a cutout through which light guide 206 extends to a point at which light exit point 210 shines light directly onto the looped string. In other embodiments, the housing further defines a cutout through which light guide 206 extends to a point at which light exit point 210 shines light directly onto the looped string.

The illustrated embodiments described herein provide a device that is capable of propelling a glow-in-the-dark looped string in an efficient and effective manner. Embodiments provide a mechanism through which the looped string can be loaded and unloaded easily, while securely retaining the looped string within the device during operation. Further, the configuration of the housing 100 as described above enables tangle-free or tangle-reduced operation of the device without requiring additional features to guide the looped string into the propelling wheels of the device. The looped string of example embodiments described herein contains phosphorescent particles or fibers embedded in or on the looped string and further generates lift as it is propelled through the air as described above, providing unique and distinct operation of the looped string as it is propelled by devices described herein.

Referring again to FIG. 16, an example embodiment of a string shooting device described herein can include a communication interface 121. The communication interface can be configured with a variety of communication protocols. According to some embodiments, the communication interface 121 can be a near-field communication (NFC) communication interface. NFC protocols employed can include Bluetooth™, Radio Frequency Identification (RFID), Zigbee™, Ultra-Wideband (UWB), or other communication techniques. Optionally, the communication interface 121 can include infrared (IR) communication protocols. The communication interface 121 of example embodiments can be used to control features of the string shooting device remotely.

According to an example embodiment, the communication interface 121 can receive instructions from a remote device to control how the string shooting device functions. For example, a string shooting device can be controlled remotely to drive the first wheel 118 and/or the second wheel 119 to propel the looped string from the string shooting device. Remote control can further control a speed at which the first and/or second wheel spin to change the rate of speed at which the looped string travels, and therefore changes a shape of the looped string based on the effects of different speeds. In the case of a string shooting device having a light source 204 for charging phosphorescent particles or fibers, a pattern of illumination of the string can be altered via remote control, along with an intensity of the illumination.

According to some embodiments, the communication interface 121 can receive commands from a remote source to cause the string shooting device to propel a sting at a certain speed and/or illuminate a string with a predefined pattern (e.g., an alternating glowing pattern). A remote source can provide commands to a plurality of communication interfaces 121 of a plurality of string shooting devices to cause each string shooting device to operate in the same manner as the others. This process can synchronize the plurality of string shooting devices to operate in the same way at the same time to produce a unique effect. Such an embodiment may be useful for a group display or show, or may be useful in an audience of people at a concert to have a stunning visual effect of synchronized, glow-in-the-dark string shooting devices collaborate with a synchronized effect.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated, in light of the present disclosure, that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed:

1. A string shooting device comprising:
 a body;
 a housing attached to the body;
 a pair of wheels disposed at least partially within the housing, wherein at least one of the pair of wheels is a driven wheel;
 a string, wherein the string comprises at least one of phosphorescent particles or phosphorescent fibers, and wherein the string is propelled along a path by the pair of wheels; and
 a light source, wherein the light source is configured to project illumination to the path along which the string travels within the housing.

2. The string shooting device of claim 1, wherein the light source comprises an LED light, an ultraviolet light, an incandescent light, a laser, or a fluorescent light.

3. The string shooting device of claim 2, wherein the light source is disposed at least partially within the body.

4. The string shooting device of claim 1, wherein the light source charges the at least one of phosphorescent particles or phosphorescent fibers of the string as the string travels along the path within the housing.

5. The string shooting device of claim 1, further comprising a light guide, wherein the light guide directs light from the light source to the path along which the string travels within the housing.

6. The string shooting device of claim 5, wherein the light guide comprises an optical element that conducts light along an illumination path.

7. The string shooting device of claim 1, wherein the housing shades the light source from view from outside of the string shooting device.

8. The string shooting device of claim 1, wherein the string defines a length, wherein only a portion of the length of the string comprises at least one of phosphorescent particles or phosphorescent fibers.

9. The string shooting device of claim 8, wherein around half of the length of the string comprises at least one of phosphorescent particles or phosphorescent fibers.

10. The string shooting device of claim 8, wherein the length of the string comprises a pattern of alternating portions of the string having at least one of phosphorescent particles or phosphorescent fibers and portions not having at least one of phosphorescent particles or phosphorescent fibers.

11. The string shooting device of claim 1, further comprising a power switch and a light switch, wherein the power switch in an on state causes the driven wheel to be driven, wherein the light switch in an on state causes the light source to illuminate in response to the power switch also being in the on state.

12. The string shooting device of claim 1, further comprising a photosensor, wherein the photosensor is arranged to sense light emanating from the string as it enters the housing, wherein the light source, responsive to a signal from the photosensor, recharges only portions of the string having light emanating from those portions.

13. A string shooting device comprising:
 a body;
 a housing attached to the body;
 a pair of wheels disposed at least partially within the housing, wherein at least one of the pair of wheels is a driven wheel; and
 a light source, wherein the light source is configured to illuminate
 a location on a path of travel of a string propelled by the string shooting device.

14. The string shooting device of claim 13, further comprising a light guide, wherein the light guide is positioned between the light source and the location, and wherein the light guide guides illumination from the light source to the location.

15. The string shooting device of claim 13, wherein the light guide comprises an optical element that conducts light along an illumination path.

16. The string shooting device of claim 13, further comprising a string, wherein the string comprises at least one of phosphorescent particles or phosphorescent fibers, and wherein the string is propelled along the path of travel by the driven wheel of the pair of wheels.

17. The string shooting device of claim 16, wherein the light source charges the at least one of phosphorescent particles or phosphorescent fibers of the string as the string travels along the path of travel.

18. The string shooting device of claim 13, wherein the light source is not visible outside of the housing.

19. The string shooting device of claim 13, further comprising a shroud, wherein the shroud substantially blocks light from the light source from escaping the housing.

20. The string shooting device of claim 13, further comprising a power switch and a light switch, wherein the power switch in an on state causes the driven wheel to be driven, wherein the light switch in an on state causes the light source to illuminate in response to the power switch also being in the on state.

21. The string shooting device of claim 13, further comprising a photosensor, wherein the photosensor is arranged to sense light emanating from a string as it enters the housing, wherein the light source, responsive to a signal from the photosensor, recharges only portions of the string having light emanating from those portions.

22. The string shooting device of claim 13, further comprising a communication interface, wherein operation of the string shooting device is controlled by a remote device via the communication interface.

23. The string shooting device of claim 22, wherein operation of the string shooting device comprises one or more of: control of a speed at which the at least one of the pair of wheels is driven and control of the light source.

24. The string shooting device of claim 23, wherein control of the light source comprises control of the light source to impart a pattern of illumination onto the location on the path of travel of the string.

* * * * *